(12) United States Patent
Muraoka et al.

(10) Patent No.: US 8,787,185 B2
(45) Date of Patent: Jul. 22, 2014

(54) BASE STATION, WIRELESS COMMUNICATION SYSTEM, METHOD FOR CONTROLLING BASE STATION, WIRELESS COMMUNICATION METHOD, CONTROL PROGRAM, AND MOBILE STATION

(75) Inventors: Kazushi Muraoka, Minato-ku (JP);
Kojiro Hamabe, Minato-ku (JP);
Masayuki Ariyoshi, Minato-ku (JP);
Toshifumi Nakamura, Minato-ku (JP)

(73) Assignee: NEC Corporation, Tokyo (JP)

(*) Notice: Subject to any disclaimer, the term of this patent is extended or adjusted under 35 U.S.C. 154(b) by 62 days.

(21) Appl. No.: 13/140,631

(22) PCT Filed: Dec. 14, 2009

(86) PCT No.: PCT/JP2009/071079
§ 371 (c)(1),
(2), (4) Date: Jun. 17, 2011

(87) PCT Pub. No.: WO2010/071186
PCT Pub. Date: Jun. 24, 2010

(65) Prior Publication Data
US 2012/0014274 A1    Jan. 19, 2012

(30) Foreign Application Priority Data
Dec. 19, 2008    (JP) .................................. 2008-324532

(51) Int. Cl.
*H04J 1/16* (2006.01)
*H04L 12/26* (2006.01)
*H04B 15/00* (2006.01)
*H04W 4/00* (2009.01)

(52) U.S. Cl.
USPC ........... 370/252; 370/329; 370/338; 455/501; 455/524

(58) Field of Classification Search
USPC ........................ 370/252–338; 375/260–299; 455/501–525, 431–438
See application file for complete search history.

(56) References Cited

U.S. PATENT DOCUMENTS 5,621,763 A * 4/1997 Walczak et al. ............... 375/312
7,437,156 B2 * 10/2008 Tanno et al. .................. 455/434
(Continued)

FOREIGN PATENT DOCUMENTS

CN    1324554 A    11/2001
CN    101133675 A    2/2008
(Continued)

OTHER PUBLICATIONS

Mochiduki et al., "Fundamental Study of Cognitive Radio System Using Distance between Transmitter and Receiver Specified by Detection of Modulation Scheme in Adaptive Modulation Technique," Proceedings of the 2008 IEICE Communications Society Conference, B-17-14, 2008, p. 457.

(Continued)

*Primary Examiner* — Man Phan
(74) *Attorney, Agent, or Firm* — Sughrue Mion, PLLC

(57) ABSTRACT

[Problem] The number of the base stations that are activated uselessly cannot be sufficiently reduced even in a light traffic state. As a result, interference between adjacent cells and power consumption cannot be sufficiently reduced.
[Means For Solving the Problems] The base station controls transmission of a control signal according to communication quality in a wireless link between a mobile station and another base station.

12 Claims, 18 Drawing Sheets

(56) References Cited

U.S. PATENT DOCUMENTS

| | | | |
|---|---|---|---|
| 8,139,662 B2* | 3/2012 | Duan et al. | 375/260 |
| 8,155,227 B2* | 4/2012 | Duan et al. | 375/260 |
| 8,189,505 B2* | 5/2012 | Usuda et al. | 370/318 |
| 8,340,703 B2* | 12/2012 | Laroia et al. | 455/502 |
| 2004/0193971 A1* | 9/2004 | Soong et al. | 714/704 |
| 2007/0147295 A1* | 6/2007 | Ishikawa et al. | 370/329 |
| 2007/0253372 A1* | 11/2007 | Nakayasu | 370/331 |
| 2009/0323625 A1* | 12/2009 | Lee et al. | 370/329 |
| 2010/0103867 A1* | 4/2010 | Kishiyama et al. | 370/320 |
| 2011/0317574 A1* | 12/2011 | Richardson | 370/252 |

FOREIGN PATENT DOCUMENTS

| | | |
|---|---|---|
| JP | 3-117121 A | 5/1991 |
| JP | 7-38937 A | 2/1995 |
| JP | 2001-78246 A | 3/2001 |
| JP | 2003-37555 A | 2/2003 |
| JP | 2004-356838 A | 12/2004 |
| JP | 2007-295318 A | 11/2007 |
| JP | 2008-66780 A | 3/2008 |
| WO | 2008129812 A1 | 10/2008 |

OTHER PUBLICATIONS

Office Action dated Jul. 12, 2013, issued by the State Intellectual Property Office of the People's Republic of China in counterpart Chinese Application No. 200980151550.0.

Office Action dated Dec. 17, 2013, issued by the Japan Patent Office in corresponding Japanese Application No. 2010-543006.

* cited by examiner

BASE STATION, WIRELESS COMMUNICATION SYSTEM, METHOD FOR CONTROLLING BASE STATION, WIRELESS COMMUNICATION METHOD, CONTROL PROGRAM, AND MOBILE STATION

CROSS REFERENCE TO RELATED APPLICATIONS

This application is a National Stage of International Application No. PCT/JP2009/071079 filed Dec. 14, 2009, claiming priority based on Japanese Patent Application No. 2008-324532, filed Dec. 19, 2008, the contents of all of which are incorporated herein by reference in their entirety.

TECHNICAL FIELD

The present invention relates to a base station, a wireless communication system, a method for controlling a base station, a wireless communication method, a control program, and a mobile station.

BACKGROUND ART

In a mobile communication system, especially a cellular system, a wide communicable service area is secured by arranging a cover area of the base station whose cell radius is different from each other so that the cover areas overlap each other. However, the signals of the base stations interfere with each other when the cover areas of. the base stations overlap each other and whereby there is a risk of decrease in line capacity. A probability of existence of the base station having no mobile station in the cover area of the cell rises with the increase of the number of the base stations. Although such base station is not used, it continues the operation and consumes an electric power needlessly.

Therefore, a technology for avoiding interference and reducing the consumed electric power in a mobile communication system is proposed. For example, patent document 1 (Japanese Patent Application Laid-Open No. 2003-37555) discloses a technology that decreases the number of base stations that operates at light traffic and interference to the neighborhood base station by monitoring a downlink signal transmitted from another base station in own base station and stopping or starting transmission from own base station in consideration of traffic condition of another base station and a received power.

As the related art, in patent document 2 (Japanese Patent Application Laid-Open No. 2001-78246), there is shown that a primary base station selects a suitable handover candidate by using a measured value of signal quality of an adjacent base station. A technology in which when another wireless base station that has better communication quality than the wireless base station with which communication is currently performed exists, the channel during communication is switched to the channel of another wireless base station is disclosed in patent document 3 (Japanese Patent Application Laid-Open No. 1991-117121). A technology in which when a total uplink interference level or a total downlink transmission power of an adjacent wireless base station is equal to or greater than a specified value, a handover of a mobile terminal under the control of the base station to the adjacent cell is suppressed is described in patent document 4 (Japanese Patent Application Laid-Open No. 2007-295318).

As the related art, a transmission power control technology in a cognitive wireless system is disclosed in non-patent document 1 (Mochizuki, Takyu, Umeda, Fujii, Nakagawa, "Fundamental Study of Cognitive Radio System Using Distance between Transmitter and Receiver Specified by Detection of Modulation Scheme in Adaptive Modulation Technique" Proceedings of The 2008 IEICE Communications Society Conference, B-17-14, 2008). In this technology, first, the cognitive wireless system estimates a modulation scheme by using a downlink signal transmitted from the base station in another wireless communication system using an adaptive modulation/demodulation and specifies a distance between the base station and the mobile station from its modulation scheme. The cognitive wireless system performs a transmission power control so that an amount of interference to the mobile station is equal to or less than a fixed value at a position of the mobile station at which the amount of interference to the mobile station is maximum (a position at which the cognitive wireless system and the mobile station are most closely located) by considering the above-mentioned distance and shares the same frequency band with another wireless communication system.

BRIEF SUMMARY OF THE INVENTION

Problems to be Solved by the Invention

In the invention described in patent document 1, the base station returns to an active state (a state in which a control signal is transmitted) from a sleep state (a state in which the transmission of the control signal is stopped) when a condition in which the traffic of the adjacent base station is heavy is satisfied. However, the mobile station which should actually perform the handover from the adjacent base station to the base station does not always exist even when the traffic of the adjacent base station becomes heavy. Therefore, the base station disclosed in patent document 1 returns to the active state uselessly even though the mobile station which should perform the handover from the adjacent base station to the base station does not exist. Therefore, a problem in which the electric power is wasted occurs. Namely, by the technology disclosed in patent document 1, the number of the base stations that are activated uselessly even in a light traffic state cannot be sufficiently reduced. As a result, the interference between adjacent cells and the power consumption cannot be sufficiently reduced.

In patent documents 2 to 4 and non-patent document 1, a technology for efficiently performing a state transition (that is, a transition from a state in which the transmission of the control signal is stopped to a state in which the control signal is transmitted or a reverse transition) of the base station is not disclosed. Namely, by using the technology disclosed in patent documents 2 to 4 and non-patent document 1, the number of the base stations that are activated uselessly cannot be sufficiently reduced. As a result, the interference between adjacent cells and the power consumption cannot be sufficiently reduced.

The present invention is made to solve the above-mentioned problem. The object of the present invention is to provide a base station, a wireless communication system, a method for controlling a base station, a wireless communication method, a control program and a mobile station, in which the electric power consumed therein can be suppressed and the electromagnetic wave interference between the base stations can be avoided.

Means for Solving the Problems

A base station of the present invention controls transmission of a control signal according to communication quality in a wireless link between a mobile station and another base station.

A wireless communication system of the present invention includes a first base station, a second base station, and at least one mobile station which can communicate with the first base station and the second base station. The second base station controls the transmission of the control signal according to the communication quality in the wireless link between the mobile station and the first base station.

A method for controlling a base station of the present invention includes the steps of: recognizing communication quality in the wireless link between the mobile station and another base station and controlling transmission of a control signal in the base station based on the recognized communication quality.

A wireless communication method of the present invention is a wireless communication method in a wireless communication system including a first base station, a second base station, and at least one mobile station which can communicate with the first base station and the second base station includes the steps of: recognizing communication quality of a wireless link between the mobile station and the first base station in the second base station and controlling transmission of a control signal according to the recognized communication quality.

A computer program of the present invention causes a computer in a base station perform a process for recognizing communication quality in a wireless link between a mobile station and another base station and a process for controlling transmission of a control signal based on the recognized communication quality.

A mobile station of the present invention is a mobile station which can communicate with a first base station and a second base station. The mobile station transmits an upward direction signal to the first base station, wherein the transmission signal is received in the second base station, and receives a control signal transmitted from the second base station based on communication quality in a wireless link between the mobile station and the first base station that is recognized based on the transmission signal in the second base station.

Advantage of the Invention

By using the present invention, the electric power consumed in the base station can be suppressed and the electromagnetic wave interference between the base stations can be avoided.

MODE FOR CARRYING OUT THE INVENTION

An exemplary embodiment of the present invention will be described in detail with reference to drawings.

A base station according to the exemplary embodiment of the present invention controls transmission of a control signal (for example, a common control signal which is announced to the entire cell of the base station) according to communication quality in a wireless link between a mobile station and another base station. For example, the base station which stops transmitting the control signal compares the above-mentioned communication quality with a predetermined threshold value and starts the transmission of the control signal when the communication quality is lower than a predetermined quality. Namely, if there is a possibility in which the communication quality is improved by establishing a wireless link between a mobile station and the base station instead of a wireless link between the mobile station and another base station, the base station starts the transmission of the control signal (in other words, an operation state is changed to the active state as described below) for the first time then. Therefore, the number of the base stations that are activated uselessly can be reduced. As a result, an electric power consumed in the base station can be more surely suppressed and the electric wave interference between the base stations can be avoided. A plurality of exemplary embodiments of the present invention will be described specifically below. Further, in each of the following exemplary embodiments, an explanation is given for a case in which a pilot signal that is the common control signal of which a signal having a predetermined pattern is continually and repeatedly transmitted is used as an example of the control signal.

[First Exemplary Embodiment]

In this exemplary embodiment, an explanation is given for a case in which "throughput" of a wireless link is used as the communication quality of the wireless link.

Figure 1:
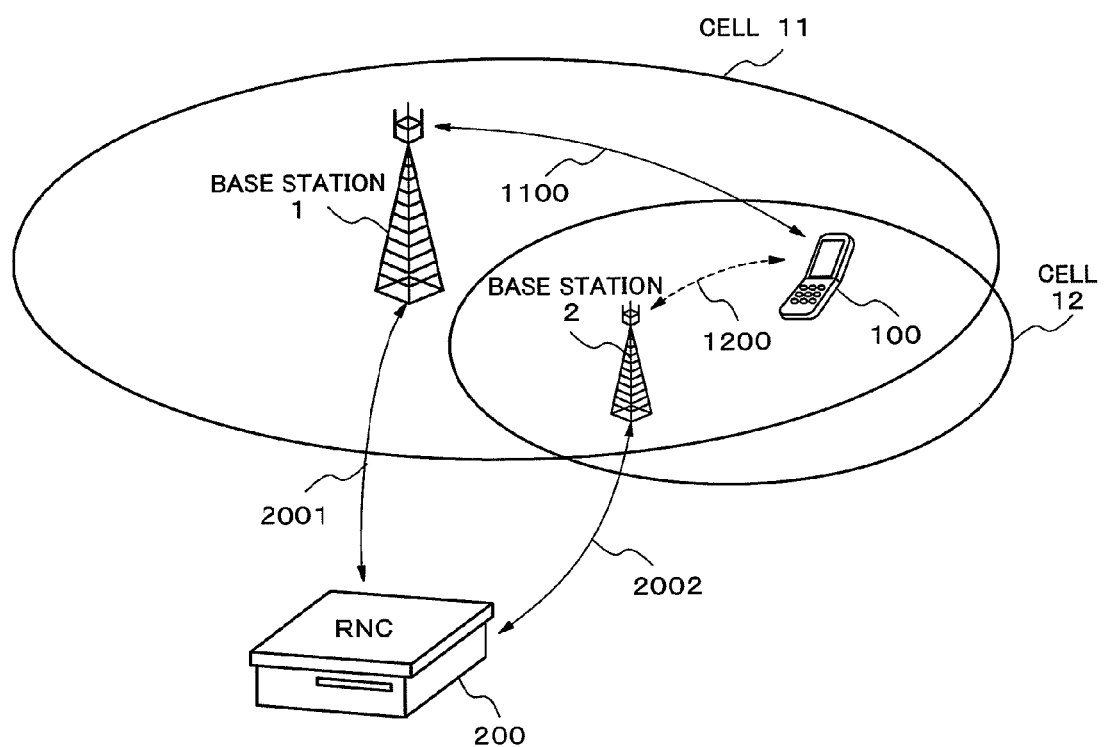
FIG. 1 is a view showing a configuration of an example of a wireless communication system according to a first exemplary embodiment of the present invention.

FIG. 1 is a view showing a configuration of an example of a wireless communication system according to a first exemplary embodiment of the present invention. This wireless communication system includes a base station 1 (called a first base station or another base station), a base station 2 (second base station), at least one mobile station 100, and a wireless network control device (hereinafter, referred to as an RNC (Radio Network Controller)) 200. The base station 1 transmits a pilot signal to the mobile station (for example, the mobile station 100 shown in FIG. 1) located in a cell 11. The mobile station 100 which receives the pilot signal communicates with the base station 1 through a wireless link 1100 based on the received pilot signal. The base station 2 can transmit the pilot signal to the mobile station located in a cell 12 and the mobile station (for example, the mobile station 100 shown in FIG. 1) which receives the pilot signal can establish a wireless link 1200 with the base station 2 and communicate with it. Here, at least a part of the cell 11 and a part of the cell 12 overlap each other. The RNC 200 is connected to the base station 1 through a link 2001 and also connected to the base station 2 through a link 2002. The RNC 200 manages the base station 1 and the base station 2. Here, a wire line or a wireless line can be used for the links 2001 and 2002. In the following explanation, the explanation is given for a case in which the link 2001 or the link 2002 is the wire line.

Figure 2:
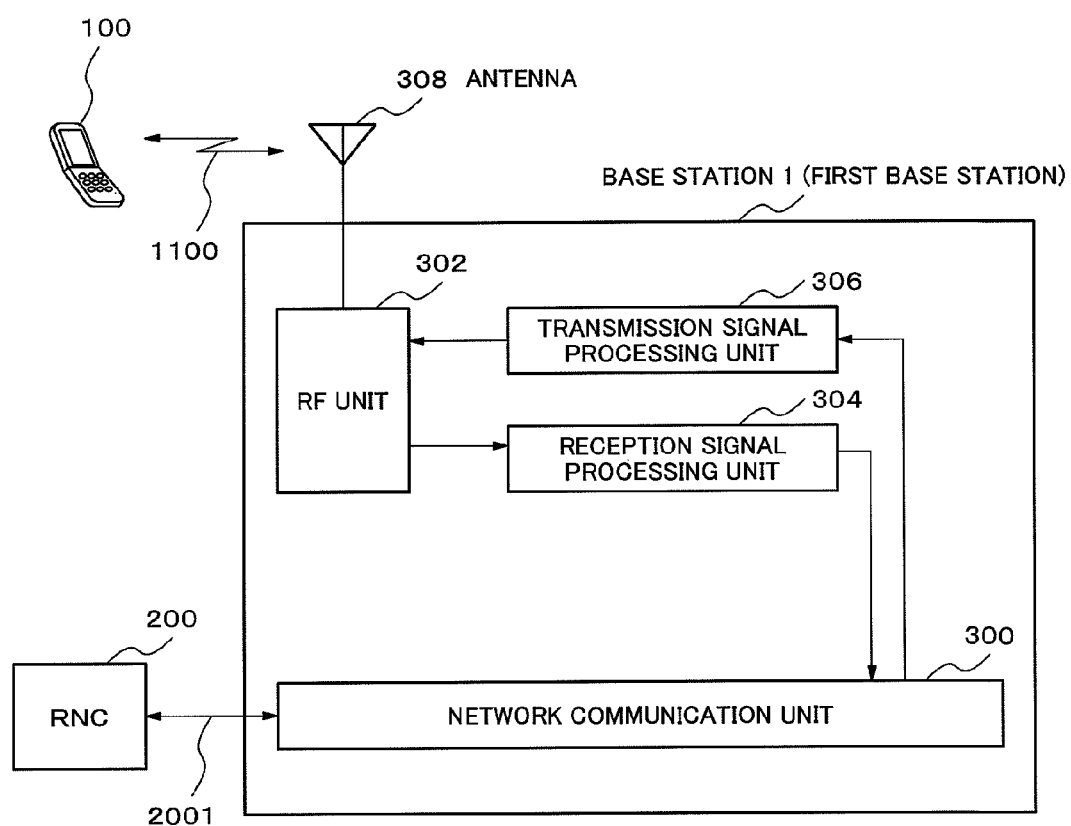
FIG. 2 is a block diagram showing an example of a first base station in a first exemplary embodiment.

FIG. 2 is a block diagram showing an example of the base station 1 as a first base station shown in FIG. 1. The base station 1 includes a network communication unit 300, an RF (Radio Frequency) unit 302, a reception signal processing unit 304, a transmission signal processing unit 306, and an antenna 308. The network communication unit 300 communicates with the RNC 200 through the link 2001. The RF unit 302 communicates with the mobile station 100 through the wireless link 1100. The reception signal processing unit 304 processes a signal that is transmitted by the mobile station 100 and received by the RF unit 302. The transmission signal processing unit 306 processes a signal to be transmitted to the mobile station 100 and outputs the processed signal to the RF unit 302. The antenna 308 emits an electric wave in a space to perform wireless communication with the mobile station 100 or captures the electric wave transmitted through the space.

Figure 3:
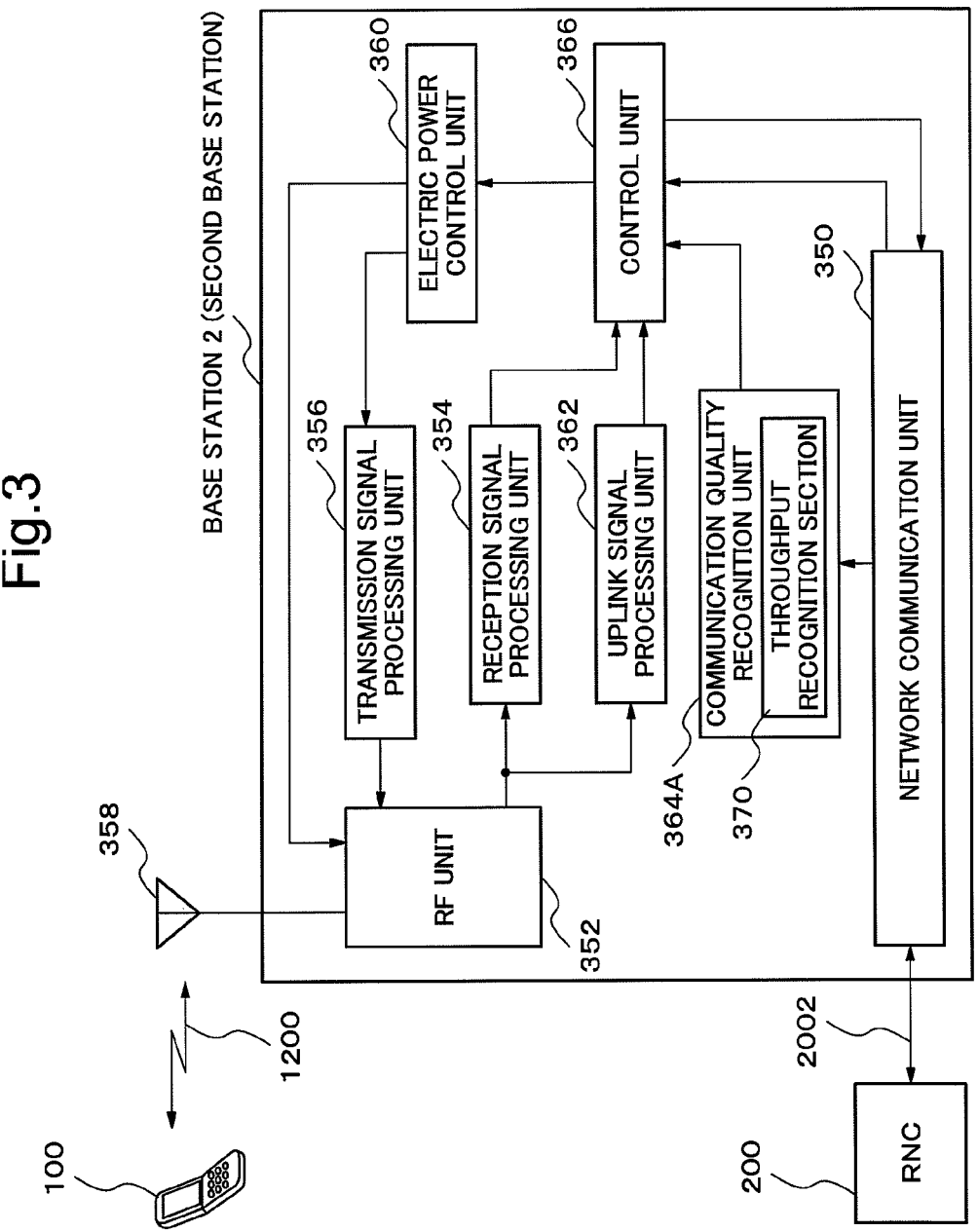
FIG. 3 is a block diagram showing an example of a second base station in a first exemplary embodiment.

FIG. 3 is a block diagram showing an example of the base station 2 as a second base station shown in FIG. 1. The base station 2 includes a network communication unit 350, an RF unit 352, a reception signal processing unit 354, a transmission signal processing unit 356, an antenna 358, an electric power control unit 360, an uplink signal processing unit 362, a communication quality recognition unit 364A, and a control unit 366. The network communication unit 350 communicates with the RNC 200 through the link 2002. The RF unit 352 communicates with the mobile station 100 through the wireless link 1200. The reception signal processing unit 354 processes the signal that is transmitted by the mobile station 100 and received by the RF unit 352. The transmission signal processing unit 356 processes the signal to be transmitted to the mobile station 100 and outputs the processed signal to the RF unit 352. The antenna 358 emits an electric wave in a space to perform wireless communication with the mobile station 100 or captures the electric wave transmitted through the space.

The electric power control unit 360 performs ON/OFF control of a power supply of the transmission signal processing unit 356, control of a transmission power in the RF unit 352, and ON/OFF control of the power supply of the RF unit 352 based on an instruction from the control unit 366.

The uplink signal processing unit 362 detects the uplink signal that is transmitted from the mobile station located in the vicinity of the base station 2 (for example, the mobile station 100 shown in FIG. 1) to another base station (for example, the base station 1 shown in FIG. 1) from the received signal from the RF unit 352 and transmits the detected uplink signal to another unit (for example, the control unit 366) in the base station 2. The uplink signal processing unit 362 measures a received power of the transmission signal that is transmitted from the mobile station to another base station in the base station 2, compares the received power with a predetermined threshold value, and transmits the comparison result to the control unit 366. By the way, when the transmission signal is a W-CDMA (Wideband-Code Division Multiple Access) signal or the like that is spread over a frequency range, it is difficult to detect the uplink signal because a signal to noise ratio (SNR: Signal to Noise Rate) of the reception signal is small. Consequently, in this case, a correlation value obtained by a de-spreading process in which a spreading code (in case of W-CDMA, a channelization code and a scramble code) used for the spreading in a transmission side is used can be utilized instead of the received power. Therefore, for example, when the uplink signal is the W-CDMA signal, the reception signal is de-spread by using the channelization code and the scramble code of the adjacent base station and the correlation value is calculated between the de-spread signal and the pilot signal. A comparison is performed between the maximum value among the correlation values obtained by this process and the predetermined threshold value and the comparison result may be transmitted to the control unit 366.

The communication quality recognition unit 364A recognizes the communication quality in the wireless link 1100 between the mobile station 100 and the base station 1 and transmits communication quality information to the control unit 366. Specifically, in the first exemplary embodiment, the communication quality recognition unit 364A has a throughput (communication rate) recognition section 370. The throughput recognition section 370 receives throughput information on the wireless link 1100 from the RNC 200 via the network communication unit 350 and transmits the received throughput information to the control unit 366. Here, specifically, the throughput information is a reception rate of data in the wireless link 1100. It may be a form not including retransmission or a form including an overhead of a protocol or the like. Further, the throughput information may be bit error rate (BER) information on the wireless link 1100. Further, the throughput information may be a packet error rate (PER) information. Furthermore, the throughput information may be information other than these.

The control unit 366 controls the state transition (in other words, the transmission of the pilot signal) of the base station 2 based on information or an instruction from the network communication unit 350, the reception signal processing unit 354, the uplink signal processing unit 362, or the communication quality recognition unit 364A. For example, the control unit 366 controls the state transition of the base station 2 based on the communication quality of the wireless link 1100 between the mobile station 100 (mobile station located in the vicinity of the base station 2) and the base station 1 (another base station other than the base station 2). More specifically, for example, when the above-mentioned communication quality does not satisfy the predetermined quality, the state of the base station 2 is changed to an active state St_11 by the control unit 366 (namely, the transmission of the pilot signal is started at a predetermined power).

Figure 4:
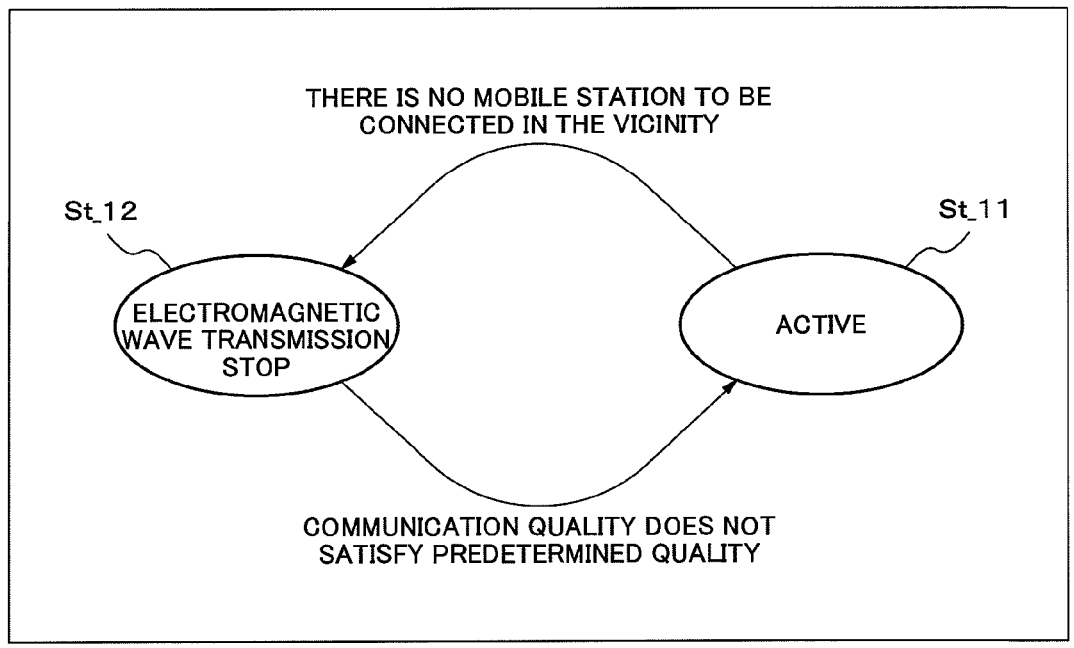
FIG. 4 is a view illustrating a state transition of a second base station.

FIG. 4 is a view illustrating a state transition of the base station 2 as the second base station. The base station 2 has two operation states as shown in FIG. 4. A first operation state is the active state St_11 in which the base station 2 can transmit/receive a wireless signal to/from a mobile station located in the cell 12 (for example, the mobile station 100 shown in FIG. 1). A second operation state is an electromagnetic wave transmission stop state St_12 in which the transmission of the wireless signal from the base station 2 to the mobile station is stopped and the wireless communication between the mobile station located in the cell 12 and the base station 2 is impossible.

For example, whenever the condition shown in FIG. 4 is met, the operation state of the base station 2 is changed from one state to another state. When for example, the communication between the base station 2 and all the mobile stations is disconnected and whereby no mobile station connecting to the base station 2 exist, the operation state of the base station 2 is changed from the active state St_11 to the electromagnetic wave transmission stop state St_12. A condition in which the operation state of the base station 2 is changed from the electromagnetic wave transmission stop state St_12 to the active state St_11 is for example, a case in which the communication quality of the wireless link 1100 between the mobile station 100 and the base station 1 does not satisfy the predetermined quality.

Further, "the stop of transmission of the electromagnetic wave from the base station 2" in the electromagnetic wave transmission stop state St_12 means specifically, for example, a state in which a power supply and a transmission function of the transmission signal processing unit 356 or the RF unit 352 are turned off by the electric power control unit 360 of the base station 2 and whereby the transmission from the base station 2 to the mobile station 100 is stopped.

Figure 5:
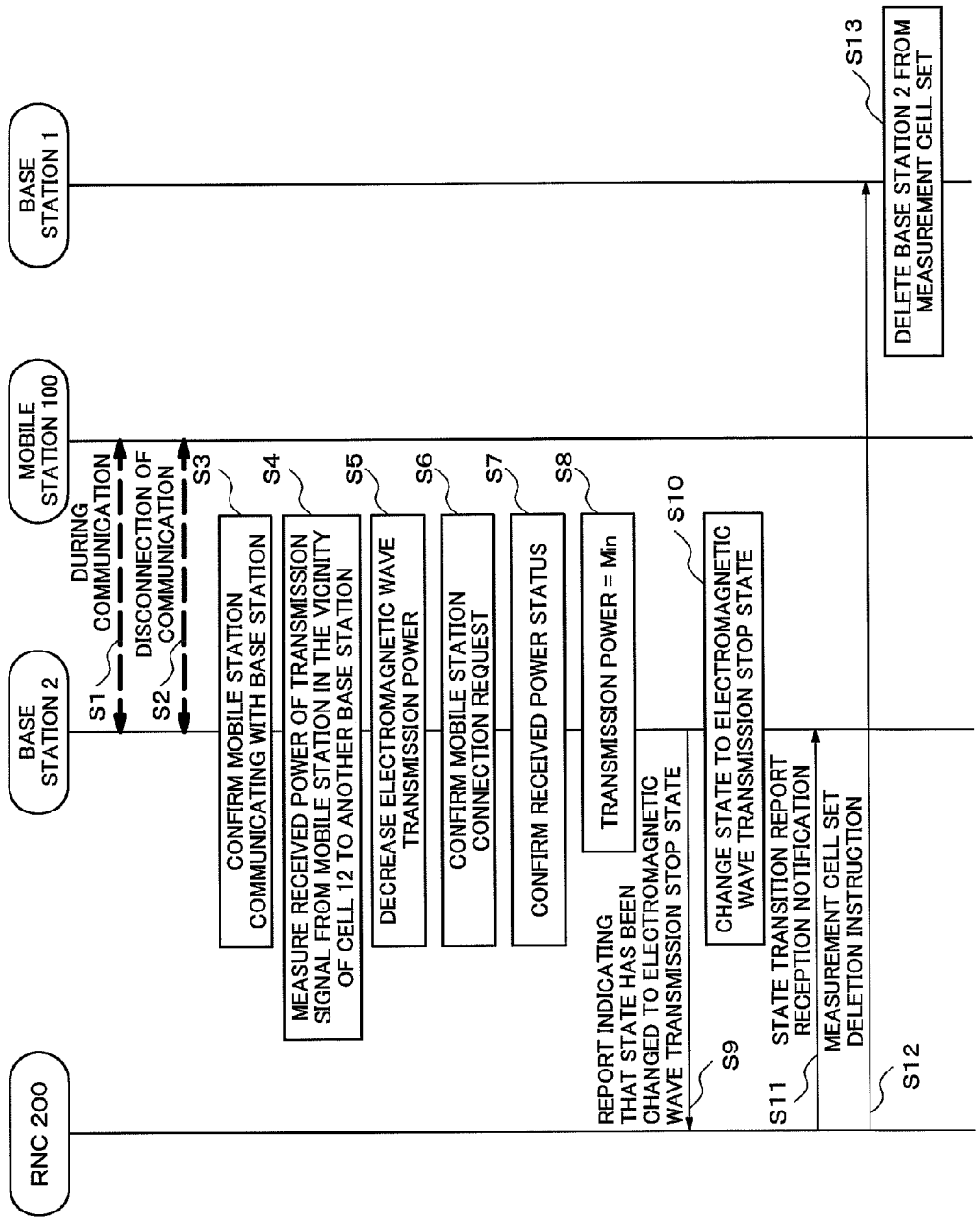
FIG. 5 is a sequence chart showing an example of operation of a wireless communication system when an operation state of a second base station is changed from an active state to an electromagnetic wave transmission stop state.

FIG. 5 is a sequence chart showing an example of operation of the wireless communication system when the operation state of the base station 2 as the second base station is changed from the active state St_11 to the electromagnetic wave transmission stop state St_12. The sequence described in FIG. 5 will be described below with reference to FIG. 1 to FIG. 3 as necessary.

First, the base station 2 is communicating with the mobile station 100 in the cell 12 (step S1). Here, for any reasons, the mobile station 100 performs a communication disconnection process to the base station 2 (step S2). The base station 2 which receives a communication disconnection request from the mobile station 100 confirms whether or not the mobile station during communication other than the mobile station 100 is located in the cell 12 (step S3).

If it is confirmed that no mobile station during communication other than the mobile station 100 is located, the base station 2 measures the received power of the transmission signal from the mobile station located in the vicinity of the cell 12 to the base station 1 (that is, another base station) in the base station 2 and compares the measured received power with a threshold value set in advance (step S4). When a predetermined time (for example, 5 seconds) has passed while the received power does not exceed the threshold value, the base station 2 determines that no mobile station exists in the vicinity thereof and gradually decreases the transmission power (for example, 1 dB per 0.1 seconds) so that the cover area of the base station 2 is reduced (Step S5).

While the transmission power is decreased, the base station 2 confirms whether or not a new connection request from the mobile station arises in the cell 12 of the base station 2 (step S6). The base. station 2 confirms whether or not the received power of the transmission signal transmitted from the mobile station to another base station exceeds the threshold value (step S7). When the new connection request does not arise and the received power is lower than the threshold value, the base station 2 repeatedly performs the processes in step S5 to step S7 until the transmission power is decreased by a predetermined amount (for example, 20 dB) (namely, until the transmission power reaches a level that is $\frac{1}{100}$ of the transmission power in the active state St_11).

When the transmission power is decreased to the predetermined threshold value (step S8), the base station 2 reports to the RNC 200 that the operation state of the base station 2 is changed to the electromagnetic wave transmission stop state St_12 (Step S9). The operation state of the base station 2 which transmits the state transition report is changed to the electromagnetic wave transmission stop state St_12 (namely, the transmission of the electric wave to the mobile station is stopped) (step S10). The RNC 200 which receives the report transmits a notification indicating that the state report of the base station 2 has been received by the RNC 200 to the base station 2 (step S11). The RNC 200 instructs the base station 1 to delete the base station 2 from a measurement cell set (step S12).

Figure 6:
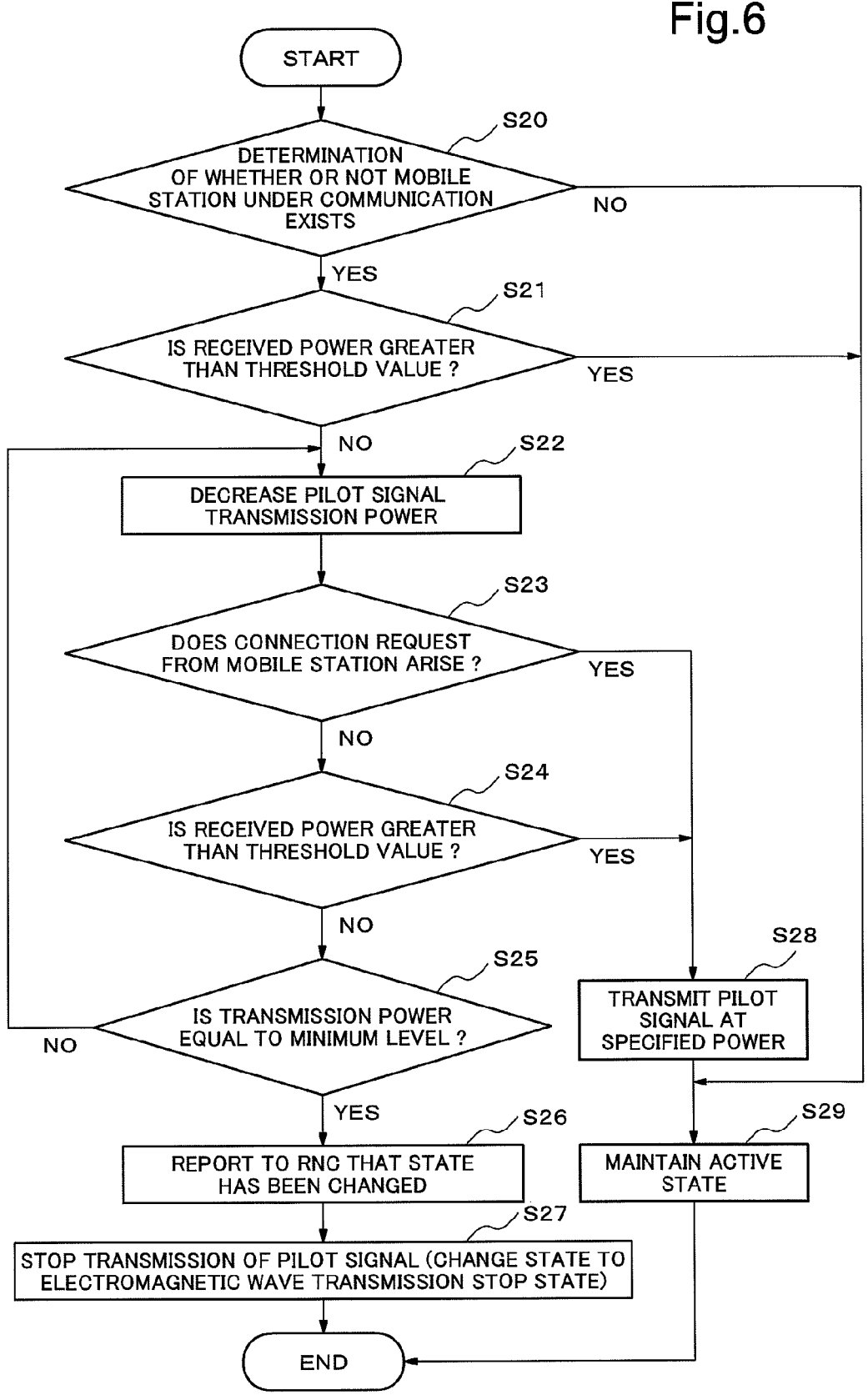
FIG. 6 is a flowchart illustrating an example of operation of a second base station when an operation state of the second base station is changed from an active state to an electromagnetic wave transmission stop state.

FIG. 6 is a flowchart illustrating an example of operation of the base station 2 as the second base station when the operation state of the base station 2 is changed from the active state St_11 to the electromagnetic wave transmission stop state St_12. The process shown in the flow is performed when the operation state of the base station 2 is changed to the active state St_11.

The reception signal processing unit 354 of the base station 2 determines whether or not the mobile station communicating with the base station 2 exists (whether or not the number of the mobile stations is 0 or whether or not the communication traffic is 0) (Step S20). When it is determined by the reception signal processing unit 354 that the mobile station communicating with the base station 2 "exists" ("No" determination in step S20), the control unit 366 maintains the operation state of the base station 2 in the active state St_11 (step S29). The control unit 366 instructs the electric power control unit 360 to keep the transmission power in a usual operation state. As a result, the base station 2 can continue to transmit/receive the wireless signal to/from the mobile station located in the cell 12.

When it is determined that the mobile station during communication does "not exist" ("Yes" determination in step S20), the uplink signal processing unit 362 measures the received power of the uplink signal that is transmitted from the mobile station located in the vicinity of the base station 2 to another base station in the base station 2, compares the received power and the predetermined threshold value, and transmits the comparison result to the control unit 366 (step S21). When the received power exceeds the threshold value ("Yes" determination in step S21), the control unit 366 maintains the operation states of the base station 2 in the active state St_11 (step S29). Namely, a state in which the base station 2 can transmit/receive the wireless signal to/from the mobile station located in the cell 12 is maintained.

On the other hand, when the received power does not exceed the threshold value ("No" determination in step S21), the control unit 366 issues an instruction to gradually decrease the transmission power of the control signal including the pilot signal to the electric power control unit 360. The electric power control unit 360 which receives the instruction to decrease the transmission power outputs an instruction to gradually decrease the transmission power to the transmission signal processing unit 356 (step S22). Here, for example, the electric power control unit 360 stops a transmission power reduction process until for example, the transmission power of the transmission signal processing unit 356 is decreased by 20 dB by reducing it at a rate of 1 dB per 0.1 seconds (namely, until the transmission power reaches a level that is 1/100 of the transmission power in the active state St_11).

While the transmission signal processing unit 356 decreases the transmission power by the control of the electric power control unit 360, the reception signal processing unit 354 confirms whether or not a new connection request from the mobile station arises in the cell 12 of the base station 2, and transmits the confirmation result to the control unit 366 (step S23). At the same time, the uplink signal processing unit 362 confirms whether or not the received power of the uplink signal that is transmitted from the mobile station located in the vicinity of the base station 2 to another base station in the base station 2 exceeds the threshold value and transmits the confirmation result to the control unit 366 (step S24).

While the transmission power is decreased, when the new connection request from the mobile station arises in the cell 12 ("Yes" determination in step S23) or when the received power of the transmission signal transmitted from the mobile station to another base station in the base station 2 exceeds the threshold value ("Yes" determination in step S24), the control unit 366 issues an instruction to increase the transmission power of the control signal including the pilot signal in the transmission signal processing unit 356 to a specified value to the electric power control unit 360. When the electric power control unit 360 receives this instruction, the electric power control unit 360 controls the transmission signal processing unit 356 and makes the transmission signal processing unit 356 increase the transmission power (step S28), and maintains the operation state of the base station 2 in the active state St_11(step S29).

Meanwhile, while the transmission power is decreased, when the new connection request from the mobile station does not arise in the cell 12 ("No" determination in step S23) and the received power of the transmission signal transmitted from the mobile station to another base station in the base station 2 falls below the threshold value ("No" determination in step S24), the transmission signal processing unit 356 determines whether or not the transmission power is decreased to the predetermined threshold value (step S25). When it has just been decreased to the threshold value ("Yes" determination in step S25), the transmission signal processing unit 356 notifies the control unit 366 of information indicating that the transmission power has been decreased to the threshold value. When the control unit 366 receives the notification, it reports to the RNC 200 via the network communication unit 350 that the operation state of the base station 2 is changed to the electromagnetic wave transmission stop state St_12 (step S26). After reporting to the RNC 200 that the operation state of the base station 2 is changed to another state, the control unit 366 issues an instruction to stop the transmission of the pilot signal in the transmission signal processing unit 356 (to change the operation state of the base station 2 to the electromagnetic wave transmission stop state St_12) to the electric power control unit 360 (step S27).

Further, the transmission power reduction process in the base station 2 is not limited to the above-mentioned method. For example, the electric power control unit 360 or the transmission signal processing unit 356 in the base station 2 can decrease the transmission power to the predetermined value in one shot instead of a gradual reduction. In the case, at least a process of step S23 in FIG. 6 can be omitted and in some cases, a process of step S24 can be omitted. Here, the above-mentioned "predetermined value" includes "0" for an output power (for example, "0" watt). Namely, it means a state in which no signal is transmitted.

Figure 7:
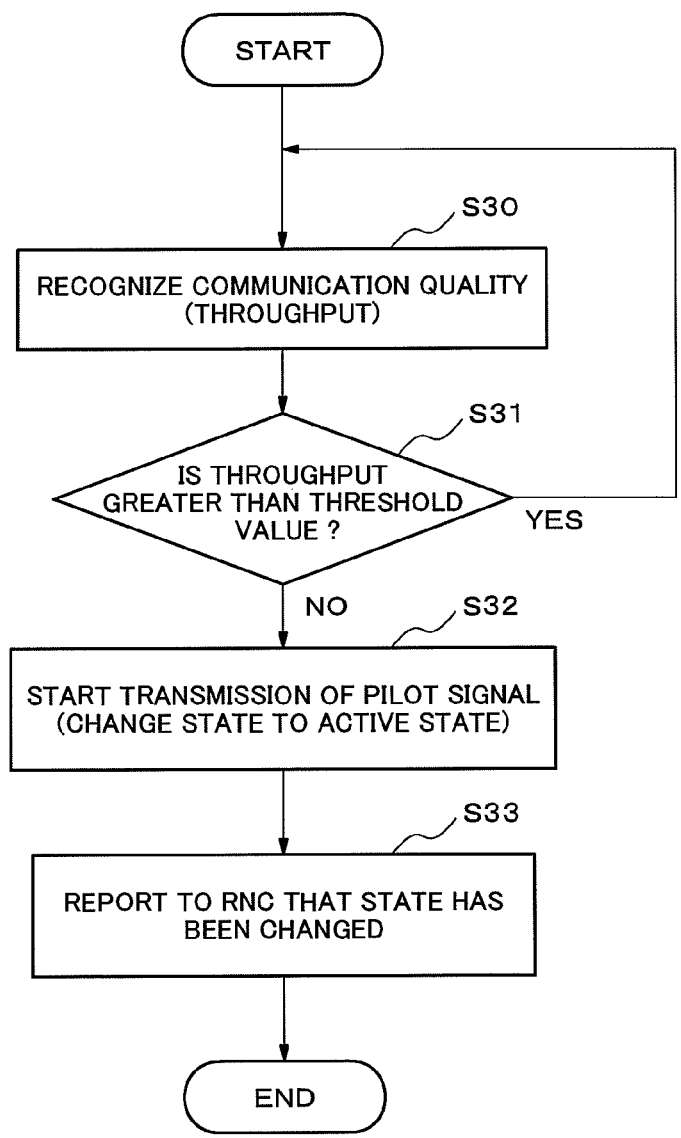
FIG. 7 is a flowchart illustrating an example of operation of a second base station when an operation state of the second base station is changed from an electromagnetic wave transmission stop state to an active state in a first exemplary embodiment.

FIG. 7 is a flowchart showing an example of operation of the base station 2 as the second base station when the operation state of the base station 2 is changed from the electromagnetic wave transmission stop state St_12 to the active state St_11. A time at which the process shown in the flow is called in the base station 2 is a time at which the operation state of the base station 2 has been changed to the electromagnetic wave transmission stop state St_12.

The communication quality recognition unit 364A of the base station 2 in the electromagnetic wave transmission stop state St_12 recognizes the communication quality of the wireless link 1100 between the mobile station 100 (mobile station located in the vicinity of the base station 2) and the base station 1 (another base station other than the base station 2) (step S30). Specifically, the throughput recognition section 370 of which the communication quality recognition unit 364A is composed receives throughput information on the wireless link 1100 from the RNC 200 (or the base station 1) via the network communication unit 350. The throughput recognition section 370 transmits the throughput information to the control unit 366. The control unit 366 determines whether or not the throughput of the wireless link 1100 is higher than the predetermined threshold value (step S31). When the throughput of the wireless link 1100 is higher than the predetermined threshold value ("Yes" determination in step S31), the processes shown in step S30 and step S31 are repeatedly performed.

On the other hand, when the throughput of the wireless link 1100 is lower than the predetermined threshold value ("No" determination in step S31), the state of the base station 2 is changed to an active state St 11 by the control unit 366 (step S32). Specifically, the control unit 366 issues an instruction to increase the transmission power of the control signal including the pilot signal in the transmission signal processing unit 356 to the specified value to the electric power control unit 360. The electric power control unit 360 controls the transmission signal processing unit 356 and increases the transmission power. As a result, the transmission of the pilot signal is started. The control unit 366 reports to the RNC 200 via the network communication unit 350 that the operation state of the base station 2 has been changed to the active state St_11 (Step S33).

In the wireless communication system according to the first exemplary embodiment described above, the base station 2 recognizes the communication quality (for example, throughput) in the wireless link between the mobile station and another base station and controls the transmission of the pilot signal based on the throughput. Specifically, by the control unit 366 of the base station 2, a comparison between the throughput of the wireless link 1100 and the predetermined threshold value is performed and the state of the base station 2 is changed to an active state St_11 when the throughput is lower than the predetermined threshold value. Namely, in case of this wireless communication system, when at least one mobile station which is currently communicating with another base station (first base station), whose communication quality is degraded, and in other words, which has a possibility in which the communication quality can be improved if the wireless link with the base station 2 is established exists, the base station 2 as the second base station starts to transmit the control signal (in other words, the operation state of the base station 2 is changed to the active state) for the first time then. Therefore, the number of the base stations that are activated uselessly like the patent document 1 can be reduced. As a result, the power consumed in the base station can be more surely suppressed and the electric wave interference between the base stations can be avoided.

Here, when the predetermined condition is met (for example, the mobile station communicating with the base station 2 does not exist or the received power of the pilot signal of the base station 2 is lower than the threshold value in the mobile station) after the operation state of the base station 2 of the wireless communication system according to the first exemplary embodiment is changed to the active state St_11, the base station 2 can perform a process in which the operation state of the base station 2 returns to the electromagnetic wave transmission stop state St_12 from the active state St_11. Namely, the base station 2 has means (for example, the control unit 366 and the electric power control unit 360) for stopping the transmission of the pilot signal when the above-mentioned predetermined condition is met after starting the transmission of the pilot signal.

Thus, by more carefully performing the state transition control, more surely, the power consumed in the base station can be suppressed and the electric wave interference between the base stations can be avoided.

Further, in the first exemplary embodiment described above, it has been explained that the transmission of the pilot signal in the base station 2 (in other words, the operation state of the base station 2 is changed to the active state St_11) is started based on the result of the absolute comparison between the throughput of the wireless link 1100 (the wireless link between the mobile station and another base station) and the predetermined threshold value. However, the start of the transmission of the pilot signal is not necessarily limited to only the result of the above-mentioned absolute comparison. For example, the control unit 366 can perform a relative comparison between the throughput of the wireless link 1100 (that is recognized by the throughput recognition section 370 of the base station 2) and the throughput (hereinafter, this is referred to as "virtual throughput") of the wireless link (for example, the wireless link 1200 in FIG. 1) when it is assumed that the mobile station 100 is connected with the base station 2, and can start to transmit the pilot signal in the base station 2 based on the relative comparison result.

Here, a method for calculating the virtual throughput will be described. The base station 2 stores a table (not shown) defining the correspondence relationship between the received power of the uplink signal that is transmitted from the mobile station located in the vicinity of the base station 2 to another base station that is measured by the uplink signal processing unit 362 and the above-mentioned virtual throughput in storage means of the base station 2 in advance. For example, the control unit 366 of the base station 2 specifies the virtual throughput corresponding to the above-mentioned received power by searching the above-mentioned table by using the measured received power as a key, performs the relative comparison between the virtual throughput and the throughput of the wireless link 1100, and starts to transmit the pilot signal when the throughput of the wireless link 1100 is relatively lower than the virtual throughput or a ratio of the throughput of the wireless link 1100 and the virtual throughput is equal to or smaller than the predetermined threshold value (for instance, when the throughput of wireless link 1100 divided by the virtual throughput is equal to or smaller than the threshold value). By using such method, the communication quality (for example, the throughput of the wireless link) between the mobile station and the base station 2 can be reflected in the start of the transmission of the pilot signal. Accordingly, the number of the base stations that are activated uselessly can be further reduced.

[Second Exemplary Embodiment]

In this exemplary embodiment, an explanation is given for a case in which "reception sensitivity" of the wireless link is used as communication quality of the wireless link.

Figure 8:
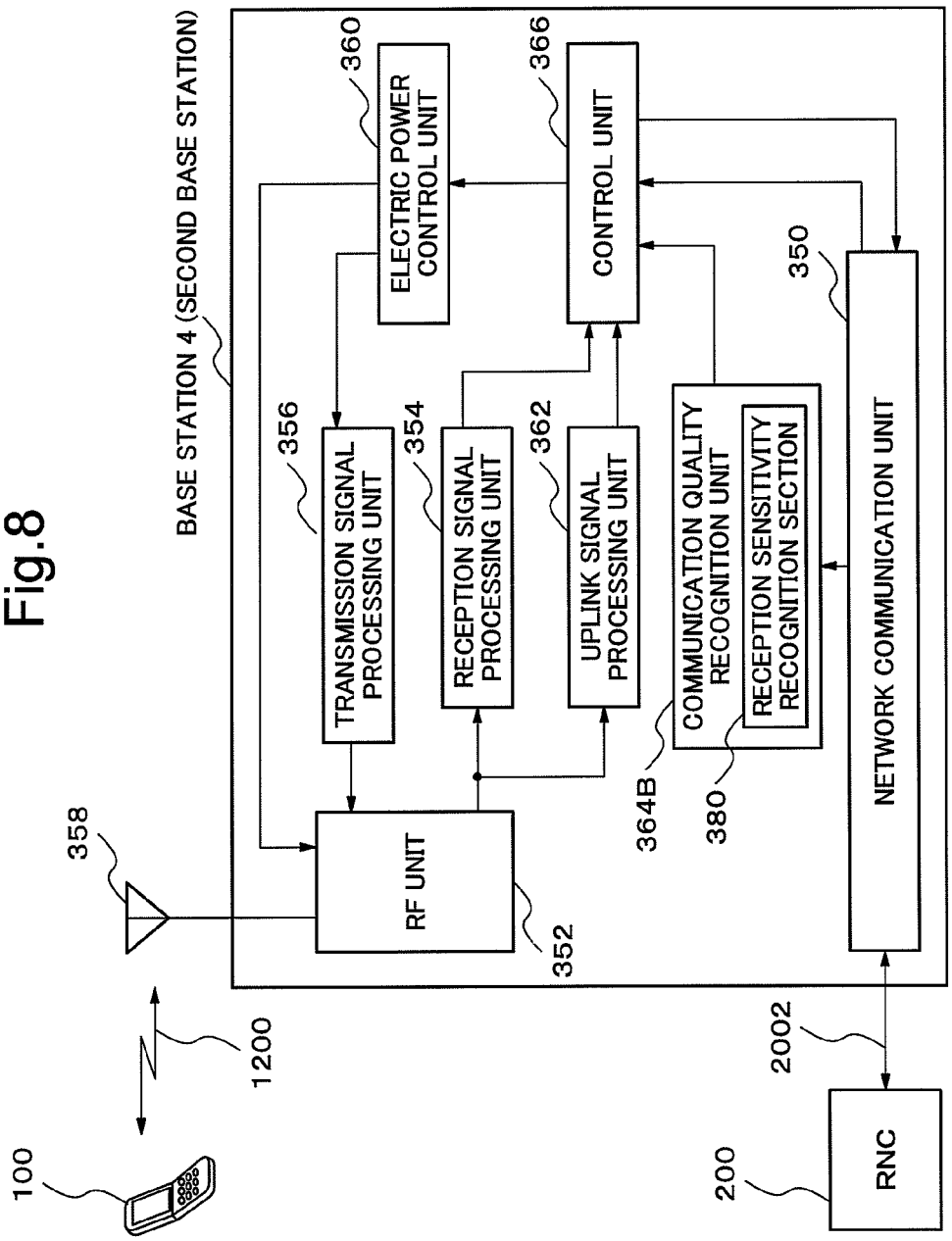
FIG. 8 is a block diagram showing an example of a second base station of which a wireless communication system according to a second exemplary embodiment of the present invention is composed.

FIG. 8 is a block diagram showing an example of a base station 4 as the second base station of which a wireless communication system according to a second exemplary embodiment of the present invention is composed. Further, in the wireless communication system, with the exception of the base station 4, a configuration group (the base station 1 as the first base station, the mobile station 100, and the RNC 200) in the second exemplary embodiment is the same as the configuration group explained in the first exemplary embodiment. Therefore, the description of them will be omitted. A communication quality recognition unit 364B includes a reception sensitivity recognition section 380 instead of the throughput recognition section 370. This is a configuration difference between the base station 4 and the base station 2 shown in FIG. 3. A configuration of the base station 4 is the same as the configuration of the base station 2 shown in FIG. 3 with the exception of the communication quality recognition unit 364B. Therefore, the description of them will be omitted.

The reception sensitivity recognition section 380 receives reception sensitivity information on the wireless link 1100 from the RNC 200 (or the base station 1) via the network communication unit 350 and transmits the reception sensitivity information to the control unit 366. Here, as the reception sensitivity information, specifically, for example, SNR information on the wireless link 1100, information on signal to interference ratio (SIR), information on signal to interference noise ratio (SINR), received power information, or the other information may be used.

The operation of the wireless communication system according to this second exemplary embodiment will be described below. Further, in the wireless communication system of this second exemplary embodiment and the wireless communication system from a third exemplary embodiment to a seventh exemplary embodiment described later, an operation sequence of the wireless communication system when the operation state of the second base station is changed from the active state to the electromagnetic wave transmission stop state and an operation flow of the second base station when the operation state of the second base station is changed from the active state to the electromagnetic wave transmission stop state are similar to the operation sequence (refer to FIG. 5) of the wireless communication system in the first exemplary embodiment and the operation flow (refer to FIG. 6) of the second base station, respectively. Therefore, the description of them will be omitted.

Figure 9:
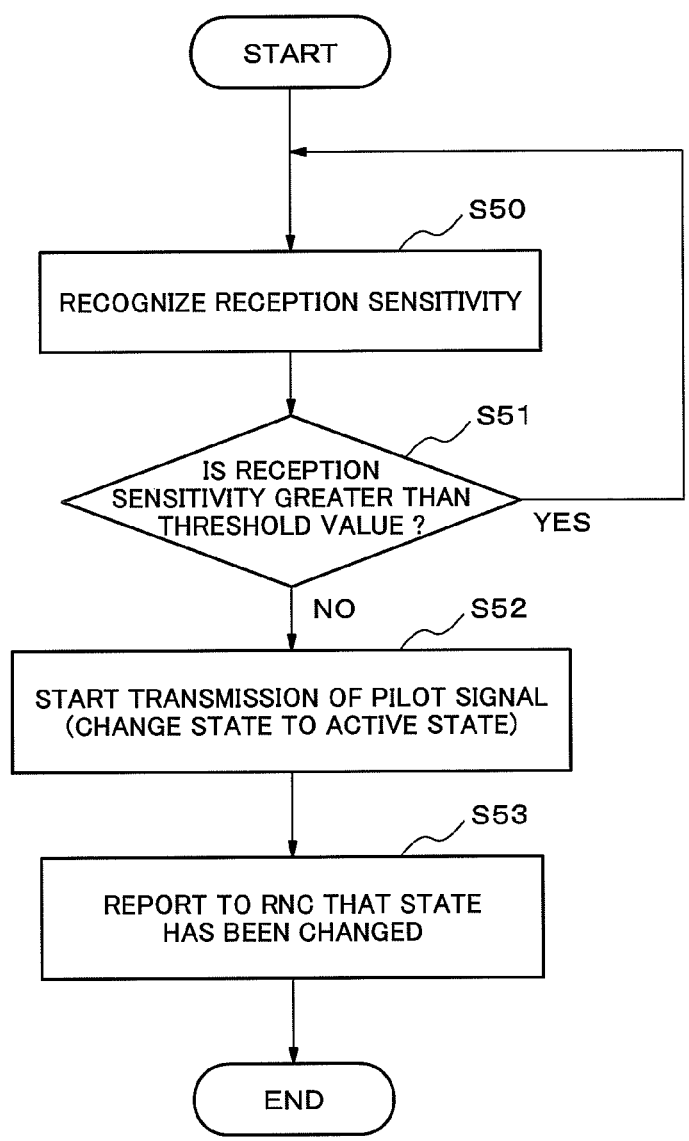
FIG. 9 is a flowchart illustrating an example of operation of a second base station when an operation state of the second base station is changed from an electromagnetic wave transmission stop state to an active state in a second exemplary embodiment.

FIG. 9 is a flowchart illustrating an example of operation of the base station 4 as the second base station when the operation state of the base station 4 is changed from the electromagnetic wave transmission stop state St_12 to the active state St_11. A time at which a process shown in the flow is called in the base station 4 is a time at which the operation state of the base station 4 has been changed to the electromagnetic wave transmission stop state St_12.

The communication quality recognition unit 364B of the base station 4 in the electromagnetic wave transmission stop state St_12 recognizes the reception sensitivity of the wireless link 1100 between the mobile station 100 (mobile station located in the vicinity of the base station 4) and the base station 1 (another base station other than the base station 4) (step S50). Specifically, the reception sensitivity recognition section 380 of which the communication quality recognition unit 364B is composed receives reception sensitivity information (for example, SNR information) on the wireless link 1100 from the RNC 200 (or the base station 1) via the network communication unit 350. The reception sensitivity recognition section 380 transmits the reception sensitivity information to the control unit 366. The control unit 366 determines whether or not the reception sensitivity of the wireless link 1100 is higher than the predetermined threshold value (step S51). When the reception sensitivity of the wireless link 1100 is higher than the predetermined threshold value ("Yes" determination in step S51), the processes shown in step S50 and step S51 are repeatedly performed.

On the other hand, when the reception sensitivity of the wireless link 1100 is lower than the predetermined threshold value ("No" determination in step S51), the state of the base station 4 is changed to the active state St_11 by the control unit 366 (step S52). Specifically, the control unit 366 issues an instruction to increase the transmission power of the control signal including the pilot signal in the transmission signal processing unit 356 to the specified value to the electric power control unit 360. The electric power control unit 360 controls the transmission signal processing unit 356 and increases the transmission power. As a result, the transmission of the pilot signal is started. The control unit 366 reports to the RNC 200 via the network communication unit 350 that the operation state of the base station 4 has been changed to the active state St_11 (step S53).

In the wireless communication system according to the second exemplary embodiment described above, the base station 4 recognizes the communication quality (for example, reception sensitivity (for example, SNR)) in the wireless link between the mobile station and another base station and controls the transmission of the pilot signal based on the reception sensitivity. Specifically, by the control unit 366 of the base station 4, a comparison between the reception sensitivity of the wireless link 1100 and the predetermined threshold value is performed and the state of the base station 4 is changed to the active state St_11 when the reception sensitivity is lower than the predetermined threshold value. Namely, in case of this wireless communication system, when at least one mobile station which is currently communicating with another base station (first base station), whose communication quality is degraded, and in other words, which has a possibility in which the communication quality can be improved if the wireless link with the base station 4 is established exists, the base station 4 as the second base station starts to transmit the control signal (in other words, the operation state of the base station 4 is changed to the active state) for the first time then. Therefore, the number of the base stations that are activated uselessly like the patent document 1 can be reduced. As a result, the power consumed in the base station can be more surely suppressed and the electric wave interference between the base stations can be avoided.

Further, in the second exemplary embodiment described above, it has been explained that the transmission of the pilot signal in the base station 4 is started based on the result of the absolute comparison between the reception sensitivity of the wireless link 1100 (that is the wireless link between the mobile station and another base station) and the predetermined threshold value. However, the start of the transmission of the pilot signal is not necessarily limited to only the result of the above-mentioned absolute comparison. For example, the control unit 366 can perform a relative comparison between the reception sensitivity of the wireless link 1100 (that is recognized by the reception sensitivity recognition section 380 of the base station 4) and the reception sensitivity of the wireless link (for example, the wireless link 1200 in FIG. 1) when it is assumed that the mobile station 100 is connected with the base station 4, and can start to transmit the pilot signal in the base station 4 based on the relative comparison result.

Here, the reception sensitivity of the wireless link 1200 is calculated based on the obtained received power of the uplink signal transmitted from the mobile station located in the vicinity of the base station 4 to another base station that is measured by the uplink signal processing unit 362 of the base station 4 in consideration of a type of used reception sensitivity information (SNR, SIR, or SINR) by obtaining. When the received power is used as the reception sensitivity, the measured received power of the uplink signal is used without any change. Next, the relative comparison between the reception sensitivity of the wireless link 1100 and the reception sensitivity of the wireless link 1200 is performed and the transmission of the pilot signal is started when the reception sensitivity of the wireless link 1100 is relatively lower than the reception sensitivity of the wireless link 1200 or a ratio of the reception sensitivity of the wireless link 1100 and the reception sensitivity of the wireless link 1200 is equal to or smaller than the predetermined threshold value (for instance, when the reception sensitivity of the wireless link 1100 divided by the reception sensitivity of the wireless link 1200 is equal to or smaller than the threshold value). By using such method, the communication quality (for example, the reception sensitivity of the wireless link) between the mobile station and the base station 4 can be reflected in the start of the transmission of the pilot signal. Therefore, the number of the base stations that are activated uselessly can be further reduced.

[Third Exemplary Embodiment]

In this exemplary embodiment, an explanation is given for a case in which "modulation scheme" of the wireless link is used as communication quality of the wireless link.

Figure 10:
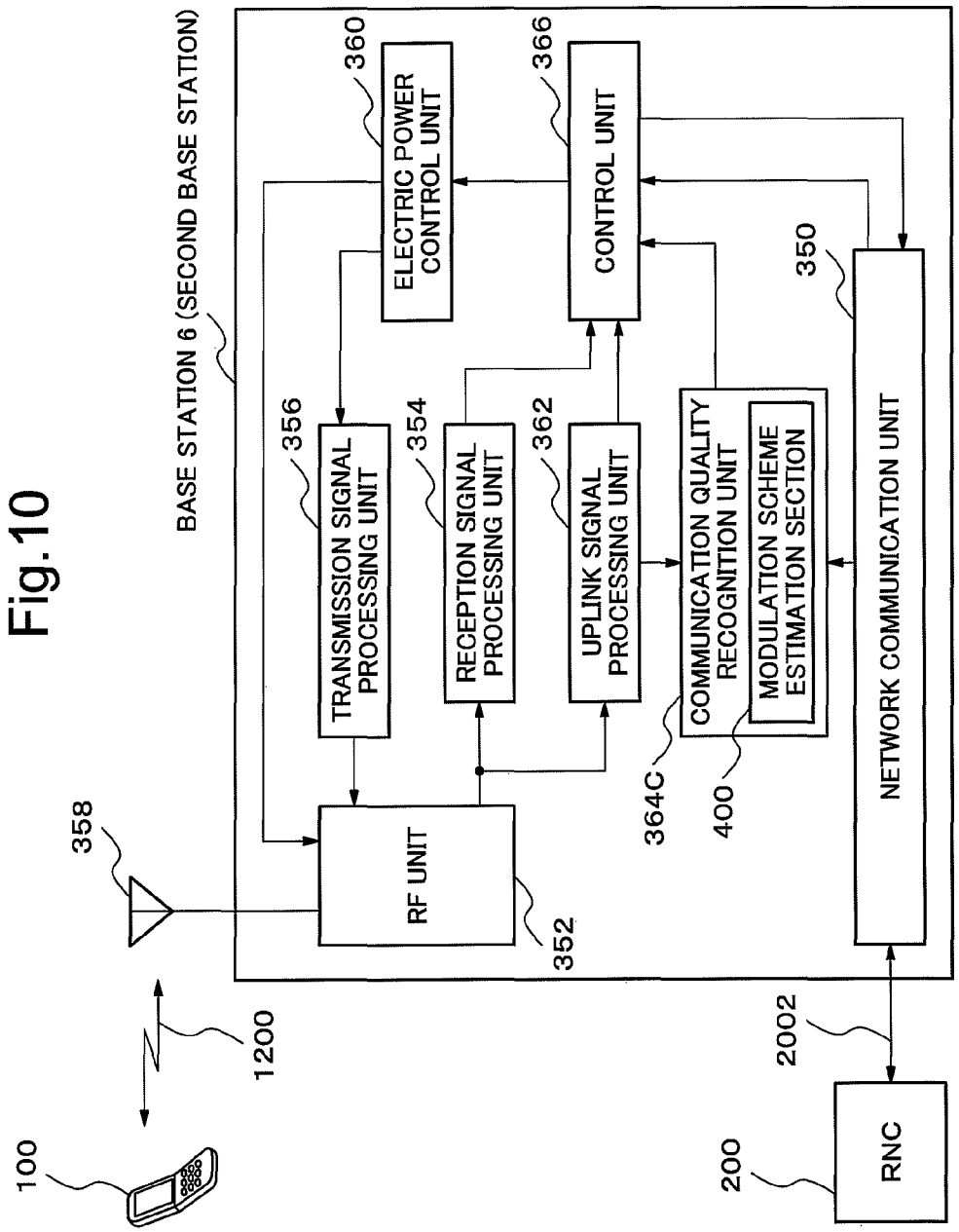
FIG. 10 is a block diagram showing an example of a second base station of which a wireless communication system according to a third exemplary embodiment of the present invention is composed.

FIG. 10 is a block diagram showing an example of a base station 6 as a second base station of which a wireless communication system according to the third exemplary embodiment of the present invention is composed. Further, in the wireless communication system, with the exception of the base station 6, a configuration group (the base station 1 as the first base station, the mobile station 100, and the RNC 200) in the third exemplary embodiment is the same as the configuration group explained in the first exemplary embodiment. Therefore, the description of them will be omitted. A communication quality recognition unit 364C includes a modulation scheme estimation section 400 instead of the throughput recognition section 370. This is a configuration difference between the base station 6 and the base station 2 shown in FIG. 3. A configuration of the base station 6 is the same as the configuration of the base station 2 shown in FIG. 3 with the exception of this communication quality recognition unit 364C. Therefore, the description of them will be omitted.

Here, for example, in case of the HSUPA (High Speed Uplink Packet Access) communication system specified by the 3GPP (3rd Generation Partnership Project), an adaptation modulation scheme in which the modulation scheme is adaptively changed according to the communication state and the quality of the wireless link is adopted. Accordingly, the modulation scheme estimation section 400 receives the uplink signal (in this case, not only the control signal but also the user data signal are included) that is transmitted from the mobile station located in the vicinity of the base station 6 (for example, the mobile station 100 in FIG. 1) to another base station (for example, the base station 1 in FIG. 1) from the uplink signal processing unit 362. The modulation scheme estimation section 400 estimates the modulation scheme (modulation multi-valued number) of the wireless link 1100 from this uplink signal. The modulation scheme estimation section 400 transmits the estimated modulation scheme information on the wireless link 1100 to the control unit 366. Here, as a method for estimating the modulation scheme, a method for discriminating the modulation scheme (for example, BPSK (Binary Phase Shift Keying), QPSK (Quadrature Phase Shift Keying), and 16QAM (Quadrature Amplitude Modulation)) by using the fact that the magnitudes of the amplitude difference and the phase difference of the modulation signal are different depending on the modulation schemes can be exemplified. This method is disclosed in for example, non-patent document 2 (Shimbo, Oka, Ata, "Modulation Classification with Carrier Frequency Offset Using Joint Moments" IEICE Transactions on Communications (Japanese Edition) Vol. J89-B, No. 10, pp. 1971-1980, 2006).

Figure 11:
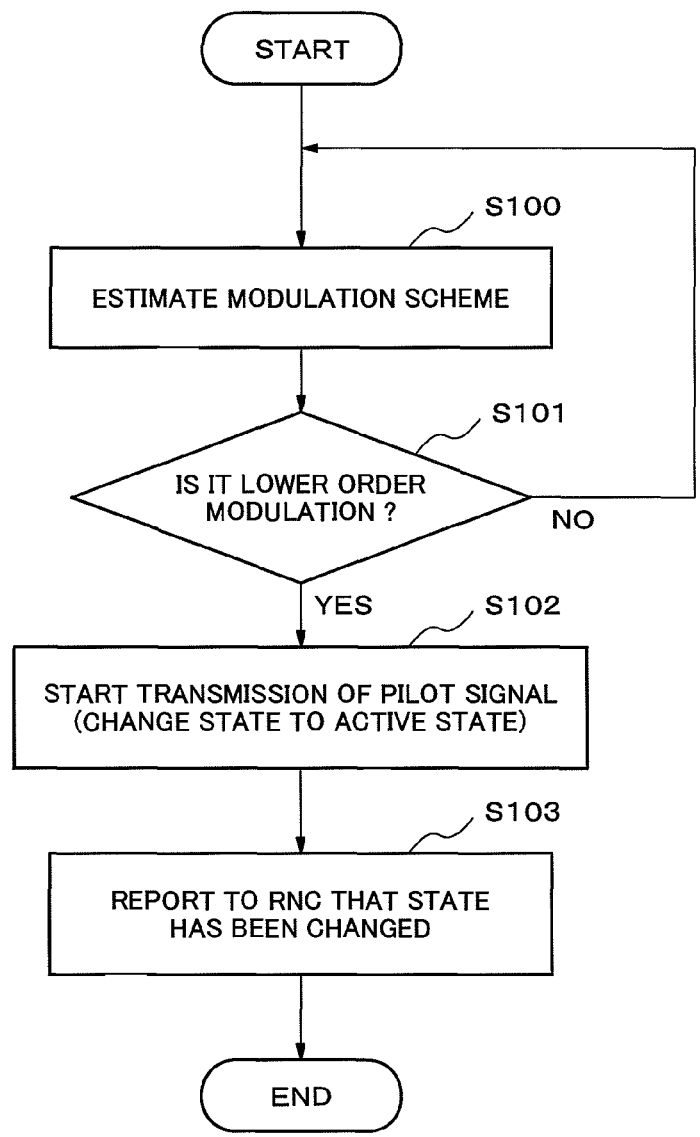
FIG. 11 is a flowchart illustrating an example of operation of a second base station when an operation state of the second base station is changed from an electromagnetic wave transmission stop state to an active state in a third exemplary embodiment.

FIG. 11 is a flowchart illustrating an example of operation of the base station 6 as the second base station when the operation state of the base station 6 is changed from the electromagnetic wave transmission stop state St_12 to the active state St_11. A time at which a process shown in the flow is called in the base station 6 is a time at which the operation state of the base station 6 has been changed to the electromagnetic wave transmission stop state St_12.

Figure 12:
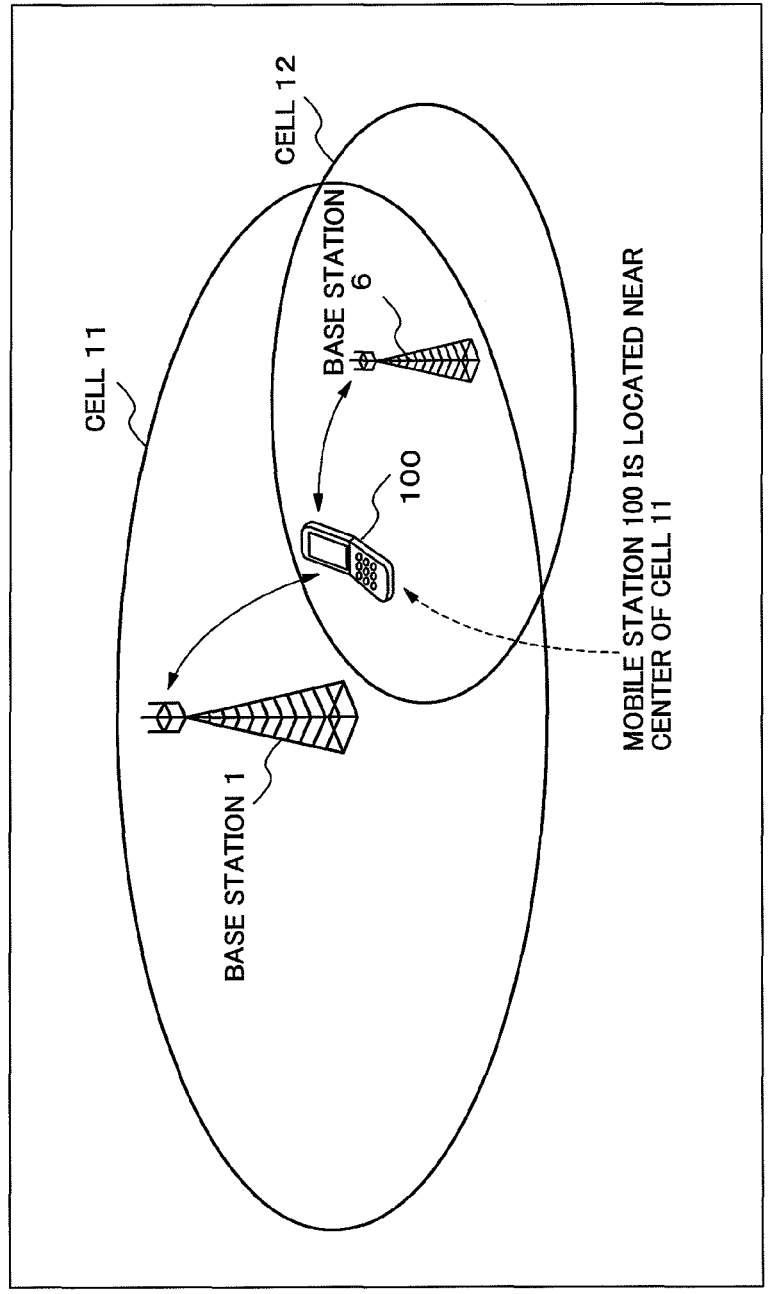
FIG. 12 is a view showing a configuration of an example of a wireless communication system in which a mobile station is located at a center of a cell of a base station with which the mobile station establishes a wireless link.

In the base station 6 in the electromagnetic wave transmission stop state St_12, the modulation scheme estimation section 400 of which the communication quality recognition unit 364C is composed receives the uplink signal that is transmitted from the mobile station 100 located in the vicinity of the base station 6 to the base station 1 from the uplink signal processing unit 362. The modulation scheme estimation section 400 estimates the modulation scheme of the wireless link 1100 from this uplink signal (step S100) and transmits the estimated modulation scheme information to the control unit 366. The control unit 366 determines whether or not the modulation scheme of the wireless link 1100 is the lower order modulation (for example, QPSK) (step S101). When the modulation scheme of the wireless link 1100 is not the lower order modulation ("No" determination in step S101), the processes shown in step S100 and step S101 are repeatedly performed. When the modulation scheme of the wireless link 1100 is a higher order modulation (for example, 16QAM), the control unit 366 determines that the mobile station 100 is located near the center of the cell 11 of the base station 1 with which the mobile station 100 establishes the wireless link (refer to FIG. 12). Namely, the control unit 366 estimates that the communication quality of the wireless link 1100 is good and defers the start of the transmission of the pilot signal from the base station 6.

Figure 13:
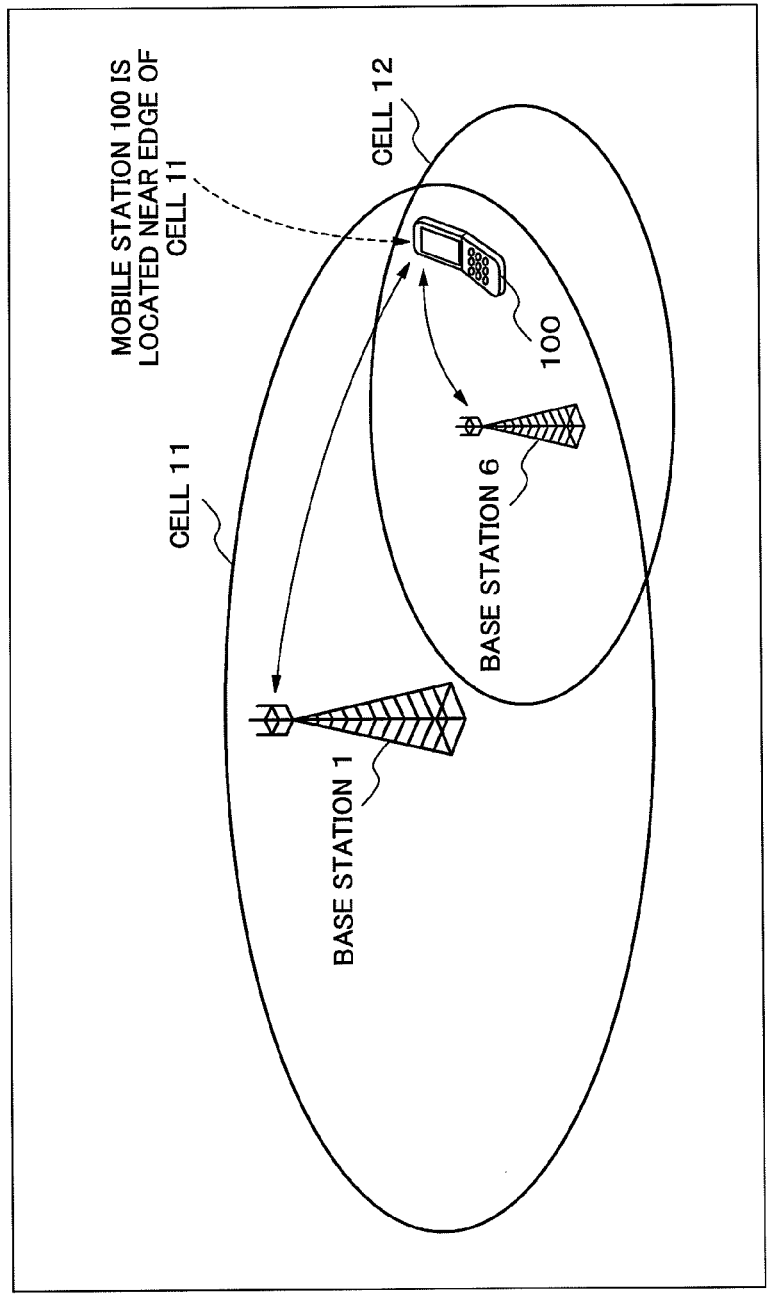
FIG. 13 is a view showing a configuration of an example of a wireless communication system in which a mobile station is located at an edge of a cell of a base station with which the mobile station establishes a wireless link.

On the other hand, when the modulation scheme of the wireless link 1100 is the lower order modulation ("Yes" determination in step S101), the state of the base station 6 is changed to an active state St_12 by the control unit 366 (step S102). Here, when the modulation scheme of the wireless link 1100 is the lower order modulation (for example, QPSK), the control unit 366 determines that the mobile station 100 is located near the edge of the cell 11 of the base station 1 with which the mobile station 100 establishes the wireless link (refer to FIG. 13). Namely, the control unit 366 estimates that the communication quality of the wireless link 1100 is not good and starts the transmission of the pilot signal from the base station 6. The control unit 366 reports to the RNC 200 via the network communication unit 350 that the operation state of the base station 6 has been changed to the active state St_11 (step S103).

In the wireless communication system according to the third exemplary embodiment described above, the base station 6 estimates the modulation scheme in the wireless link between the mobile station and another base station and controls the transmission of the pilot signal based on the estimated modulation scheme. Specifically, when the modulation scheme of the wireless link 1100 is the lower order modulation, the state of the base station 6 is changed to the active state St_11 by the control unit 366 of the base station 6. Namely, in case of this wireless communication system, when at least one mobile station which is currently communicating with another base station (first base station), which has a possibility in which the communication quality is degraded, and in other words, which has a possibility in which the communication quality can be improved if the wireless link with the base station 6 is established exists, the base station 6 as the second base station starts to transmit the control signal (in other words, the operation state of the base station 6 is changed to the active state) for the first time then. Therefore, the number of the base stations that are activated uselessly like the patent document 1 can be reduced. As a result, the power consumed in the base station can be more surely suppressed and the electric wave interference between the base stations can be avoided.

Further, in the third exemplary embodiment described above, it has been explained that the recognition of the communication quality (in this case, modulation scheme) of the wireless link 1100 is performed by performing the estimation from the uplink signal that is transmitted from the mobile station located in the vicinity of the base station 6 to another base station. However, the recognition of the modulation scheme in the base station 6 is not limited to the above method. For example, a method in which the base station 6 receives the modulation scheme information itself on the wireless link 1100 from a backbone (for example, the RNC 200 or the base station 1) can be used.

[Fourth Exemplary Embodiment]

In this exemplary embodiment, an explanation is given for a case in which "the number of MIMO (Multiple Input Multiple Output) streams" of the wireless link is used as communication quality of the wireless link.

Figure 14:
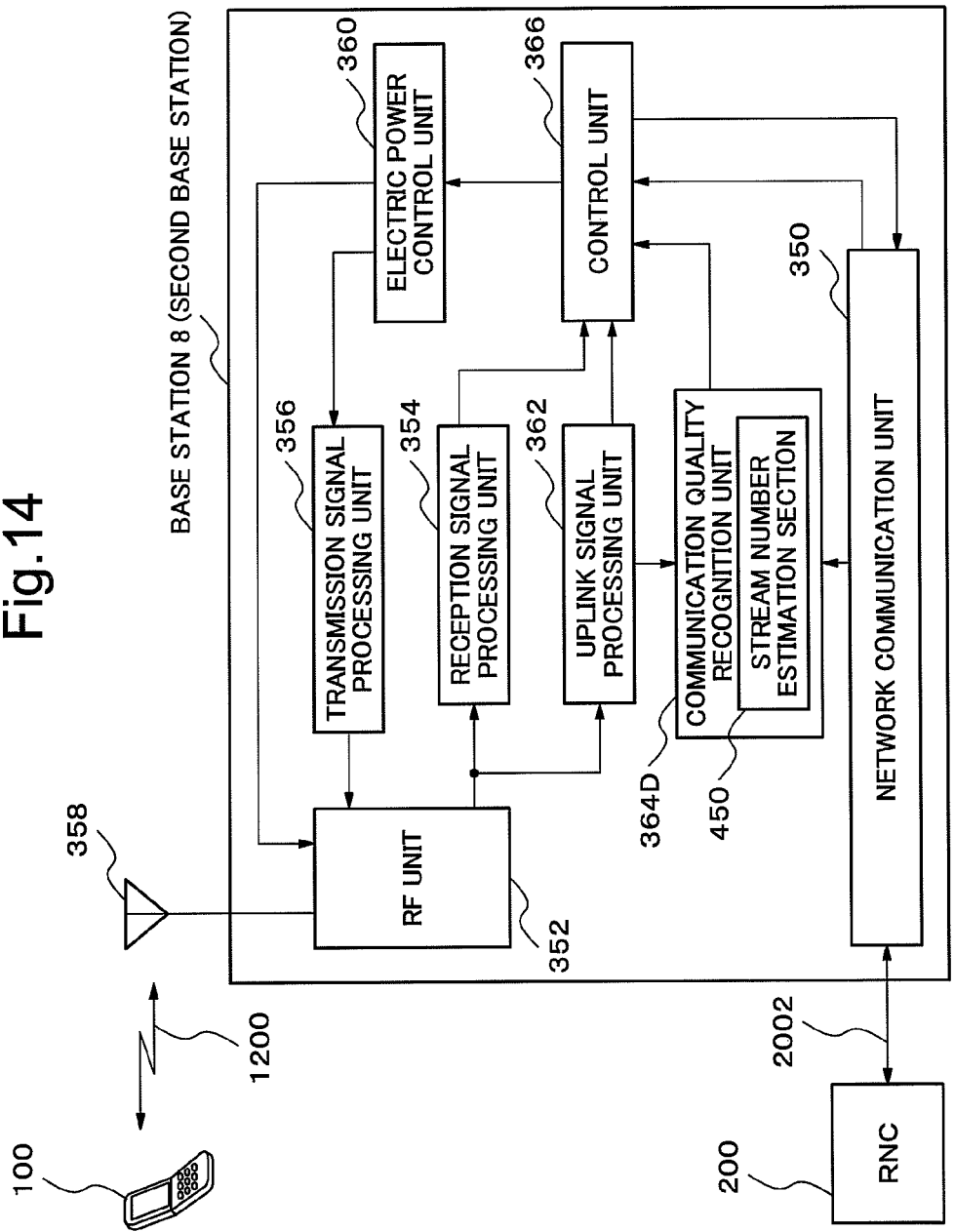
FIG. 14 is a block diagram showing an example of a second base station of which a wireless communication system according to a fourth exemplary embodiment of the present invention is composed.

FIG. 14 is a block diagram showing an example of a base station 8 as the second base station of which a wireless communication system according to a fourth exemplary embodiment of the present invention is composed. Further, in the wireless communication system, with the exception of the base station 8, a configuration group (the base station 1 as the first base station, the mobile station 100, and the RNC 200) in the fourth exemplary embodiment is the same as the configuration group explained in the first exemplary embodiment. Therefore, the description of them will be omitted. A communication quality recognition unit 364D includes a stream number estimation section 450 instead of the throughput recognition section 370. This is a configuration difference between the base station 8 and the base station 2 shown in FIG. 3. A configuration of the base station 8 is the same as the configuration of the base station 2 shown in FIG. 3 with the exception of the communication quality recognition unit 364D. Therefore, the description of them will be omitted.

In the mobile station having a plurality of antennas for performing the MIMO, in case of multi-stream transmission, the transmission power is greater than that in case of a single stream transmission. Therefore, the mobile station located near the edge of the cell that requires relatively large transmission power may use single stream transmission without using multi-stream transmission. In contrast, because the mobile station located near the center of the cell does not require large transmission power compared to the mobile station located near the edge of the cell. Therefore, an increase of a transmission capacity is attempted by performing the multi-stream transmission. To such mobile station, the stream number estimation section 450 receives the uplink signal (in this case, not only the control signal but also the user data signal are included) that is transmitted from the mobile station located in the vicinity of the base station 8 (for example, the mobile station 100 in FIG. 1) to another base station (for example, the base station 1 in FIG. 1) from the uplink signal processing unit 362. The stream number estimation section 450 estimates the number of MIMO streams of the wireless link 1100 from this uplink signal. The stream number estimation section 450 transmits the estimated stream number information of the wireless link 1100 to the control unit 366. Here, as a method for estimating the number of MIMO streams, for example, a method for estimating the number of transmission streams based on the deviation between the average amplitude level and the instantaneous amplitude level of the reception signal by using that fluctuation of a received signal point becomes larger with the increase of the number of transmission streams can be exemplified. This method is disclosed in for example, non-patent document 3 (Takyu, Fujii, Umeda, Nakagawa "Detection Method for Recognizing Number of Parallel Transmitted Symbols in MIMO-cognitive Wireless Communication" IEICE technical report SR-2007-91, 2008).

Figure 15:
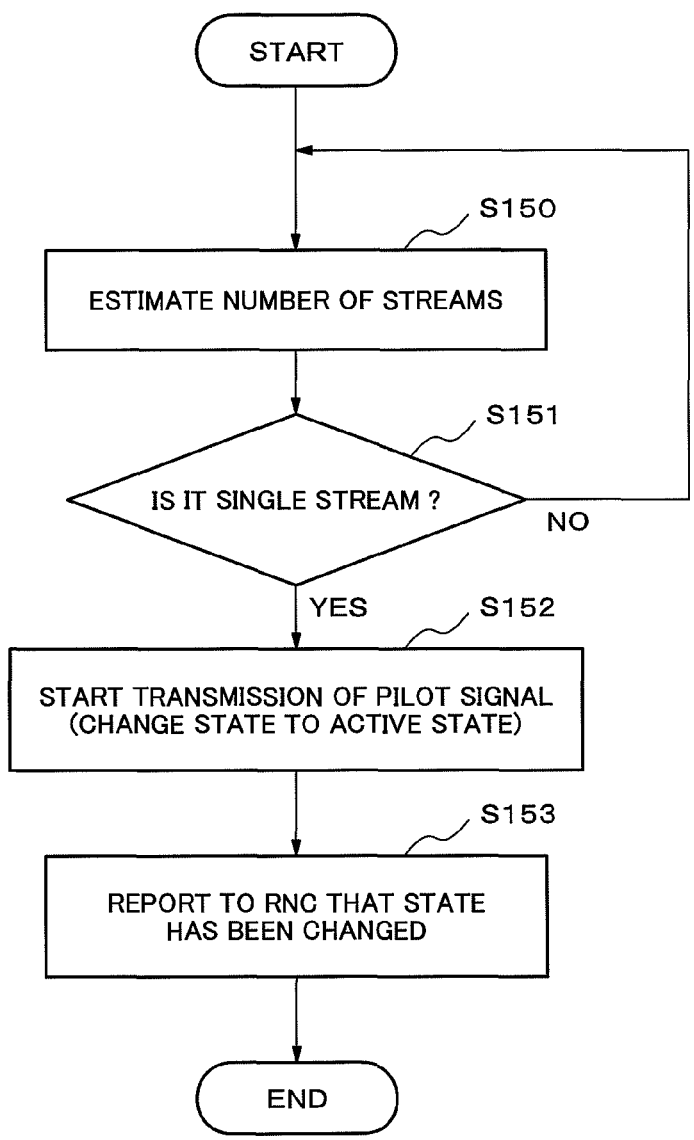
FIG. 15 is a flowchart illustrating an example of operation of a second base station when an operation state of the second base station is changed from an electromagnetic wave transmission stop state to an active state in a fourth exemplary embodiment.

FIG. 15 is a flowchart illustrating an example of operation of the base station 8 as the second base station when the operation state of the base station 8 is changed from the electromagnetic wave transmission stop state St_12 to the active state St_11. A time at which a process shown in the flow is called in the base station 8 is a time at which the operation state of the base station 8 has been changed to the electromagnetic wave transmission stop state St_12.

In the base station 8 in the electromagnetic wave transmission stop state St_12, the stream number estimation section 450 of which the communication quality recognition unit 364D is composed receives the uplink signal that is transmitted from the mobile station 100 located in the vicinity of the base station 8 to the base station 1 from the uplink signal processing unit 362. The stream number estimation section 450 estimates the number of MIMO streams of the wireless link 1100 from this uplink signal (step S150) and transmits the estimated MIMO stream information to the control unit 366. The control unit 366 determines whether or not the number of MIMO streams of the wireless link 1100 is one (that is a single stream) (step S151). When the MIMO stream of the wireless link 1100 is not the single stream ("No" determination in step S151), the processes shown in step S150 and step S151 are repeatedly performed. When the MIMO stream of the wireless link 1100 is not the single stream (that is the multi-stream), the control unit 366 determines that the mobile station 100 is located near the center of the cell 11 of the base station 1 with which the mobile station 100 establishes the wireless link (refer to FIG. 12). Namely, the control unit 366 estimates that the communication quality of the wireless link 1100 is good and defers the start of the transmission of the pilot signal from the base station 8.

On the other hand, when the MIMO stream of the wireless link 1100 is the single stream ("Yes" determination in step S151), the state of the base station 8 is changed to the active state St_11 by the control unit 366 (step S152). Here, when the MIMO stream of the wireless link 1100 is the single stream, the control unit 366 determines that the mobile station 100 is located near the edge of the cell 11 of the base station 1 with which the mobile station 100 establishes the wireless link (refer to FIG. 13). Namely, the control unit 366 estimates that the communication quality of the wireless link 1100 is not good and starts the transmission of the pilot signal from the base station 8. The control unit 366 reports to the RNC 200 via the network communication unit 350 that the operation state of the base station 8 is changed to the active state St_11 (step S153).

In the wireless communication system according to the fourth exemplary embodiment described above, the base station 8 estimates the number of MIMO streams in the wireless link between the mobile station and another base station and controls the transmission of the pilot signal based on the estimated number of MIMO streams. Specifically, when the MIMO stream of the wireless link 1100 is the single stream, the state of the base station 8 is changed to the active state St_11 by the control unit 366 of the base station 8. Namely, in case of this wireless communication system, when at least one mobile station which is currently communicating with another base station (first base station), which has a possibility in which the communication quality is degraded, and in other words, which has a possibility in which the communication quality can be improved if the wireless link with the base station 8 is established exists, the base station 8 as the second base station starts to transmit the control signal (in other words, the operation state of the base station 8 is changed to the active state) for the first time then. Therefore, the number of the base stations that are activated uselessly like the patent document 1 can be reduced. As a result, the power consumed in the base station can be more surely suppressed and the electric wave interference between the base stations can be avoided.

Further, in the fourth exemplary embodiment described above, it has been explained that the recognition of the communication quality (in this case, the number of MIMO streams) of the wireless link 1100 is performed by performing the estimation from the uplink signal that is transmitted from the mobile station located in the vicinity of the base station 8 to another base station. However, the recognition of the number of MIMO streams in the base station 8 is not limited to the above method. For example, a method in which the base station 8 receives MIMO stream number information itself on the wireless link 1100 from a backbone (for example, the RNC 200 or the base station 1) can be used.

[Fifth Exemplary Embodiment]

In this exemplary embodiment, an explanation is given for a case in which "access scheme" of the wireless link is used as communication quality of the wireless link.

Figure 16:
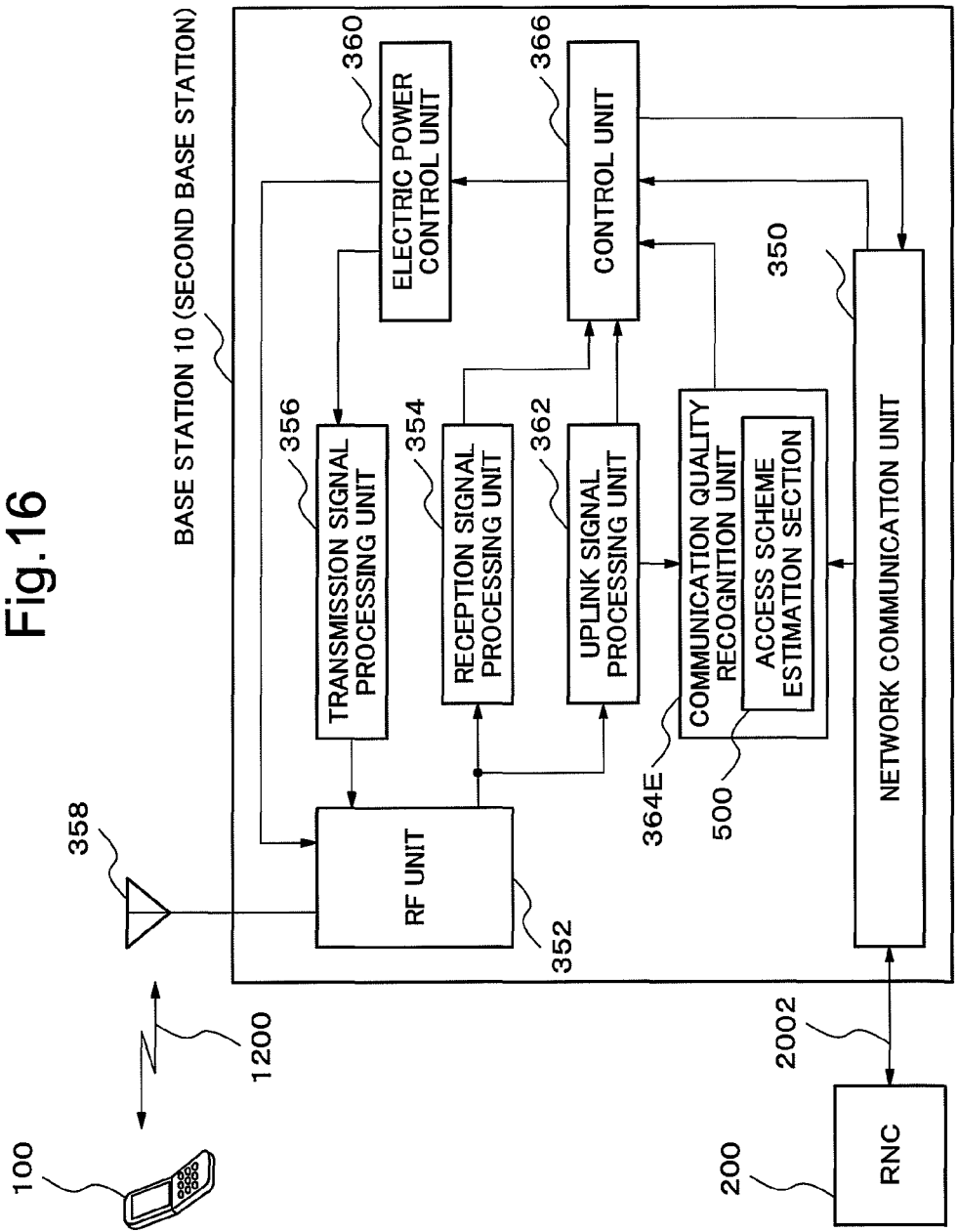
FIG. 16 is a block diagram showing an example of a second base station of which a wireless communication system according to a fifth exemplary embodiment of the present invention is composed.

FIG. 16 is a block diagram showing an example of a base station 10 as the second base station of which a wireless communication system according to a fifth exemplary embodiment of the present invention is composed. Further, in the wireless communication system, with the exception of the base station 10, a configuration group (the base station 1 as the first base station, the mobile station 100, and the RNC 200) in the fifth exemplary embodiment is the same as the configuration group explained in the first exemplary embodiment. Therefore, the description of them will be omitted. A communication quality recognition unit 364E includes an access scheme estimation section 500 instead of the throughput recognition section 370. This is a configuration difference between the base station 10 and the base station 2 shown in FIG. 3. A configuration of the base station 10 is the same as the configuration of the base station 2 shown in FIG. 3 with the exception of the communication quality recognition unit 364E. Therefore, the description of them will be omitted.

The access scheme estimation section 500 receives the uplink signal (in this case, not only the control signal but also the user data signal are included) that is transmitted from the mobile station located in the vicinity of the base station 10 (for example, the mobile station 100 in FIG. 1) to another base station (for example, the base station 1 in FIG. 1) from the uplink signal processing unit 362. The access scheme estimation section 500 estimates the access scheme (for example, SC-FDMA (Single-Carrier Frequency Division Multiple Access), OFDM (Orthogonal Frequency Division Multiplexing)) of the wireless link 1100 from this uplink signal. The access scheme estimation section 500 transmits the estimated access scheme information of the wireless link 1100 to the control unit 366.

Here, for example, an uplink access scheme of which in order to reduce a PAPR (Peak to Average Power Ratio) of the mobile station located near the edge of the cell and on the other hand, increase a transmission capacity of the mobile station located near the center of the cell, the OFDM and the SC-FDMA are switched is proposed in LTE (Long Term Evolution)-Advanced. For example, this method is disclosed in non-patent document 4 (L. Liu, T. Inoue, K. Koyanagi, Y. Kakura, "Wireless Access Schemes for LTE-Advanced Uplink" Proceedings of The 2008 IEICE Communications Society Conference, BS-4-10, 2008). In this access scheme, a high transmission power is required for the mobile station located near the edge of the cell and whereby, a PAPR problem occurs. Therefore, the SC-FDMA that has low PAPR compared to the OFDM is employed as the access scheme. On the other hand, a low transmission power is enough for the mobile station located near the center of the cell and thereby, no PAPR problem occurs. Therefore, the OFDM whose transmission capacity is large is employed. Here, as a method for estimating the access scheme, a method for discriminating the access scheme by using the fact that the PAPR of the OFDM and the PAPR of the SC-FDMA are different from each other is exemplified. The PAPR of the reception signal that is a target to be discriminated is measured, and the measured PAPR is compared with a threshold value specified in advance.

Figure 17:
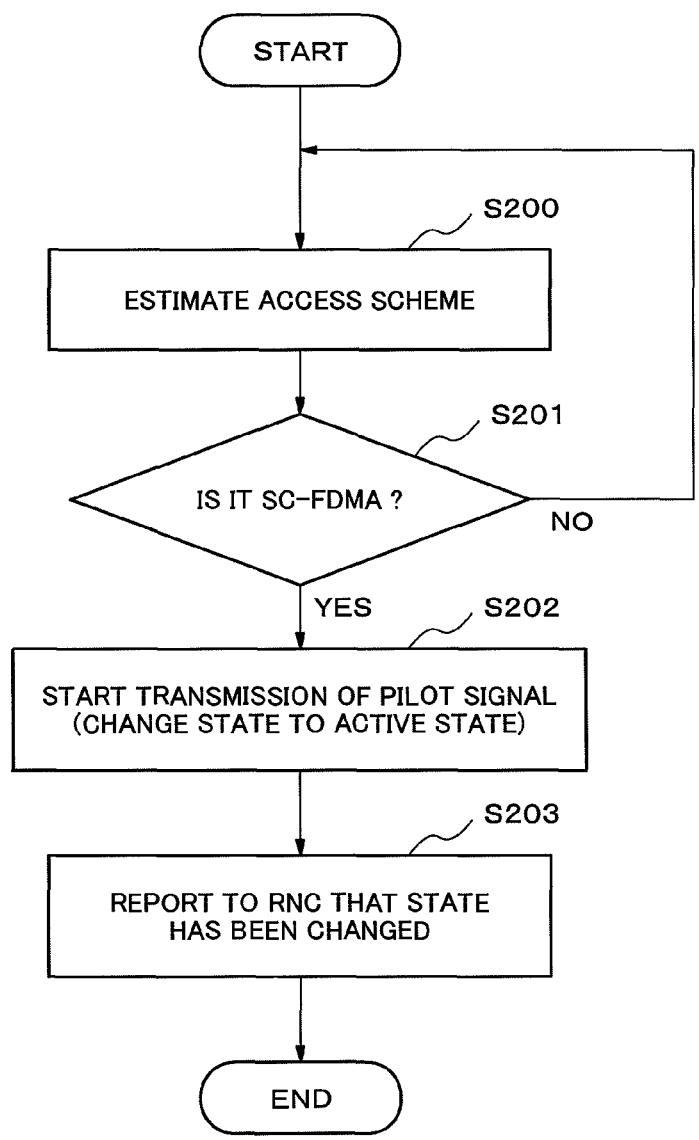
FIG. 17 is a flowchart illustrating an example of operation of a second base station when an operation state of the second base station is changed from an electromagnetic wave transmission stop state to an active state in a fifth exemplary embodiment.

FIG. 17 is a flowchart illustrating an example of operation of a base station 10 as the second base station when the operation state of the base station 10 is changed from the electromagnetic wave transmission stop state St_12 to the active state St_11. A time at which the process shown in the flow is called in the base station 10 is a time at which the operation state of the base station 10 has been changed to the electromagnetic wave transmission stop state St_12.

In the base station 10 in the electromagnetic wave transmission stop state St_12, the access scheme estimation section 500 of which the communication quality recognition unit 364E is composed receives the uplink signal that is transmitted from the mobile station 100 located in the vicinity of the base station 10 to the base station 1 from the uplink signal processing unit 362. The access scheme estimation section 500 estimates the access scheme of the wireless link 1100 from this uplink signal (step S200) and transmits the estimated access scheme information to the control unit 366. The control unit 366 determines whether or not the access scheme of the wireless link 1100 is the SC-FDMA (step S201). When the access scheme of the wireless link 1100 is not the SC-FDMA ("No" determination in step S201), the processes shown in step S200 and step S201 are repeatedly performed. When the access scheme of the wireless link 1100 is not the SC-FDMA and it is the OFDM, the control unit 366 determines that the mobile station 100 is located near the center of the cell 11 of the base station 1 with which the mobile station 100 establishes the wireless link (refer to FIG. 12). Namely, the control unit 366 estimates that the communication quality of the wireless link 1100 is good and defers the start of the transmission of the pilot signal from the base station 10.

On the other hand, when the access scheme of the wireless link 1100 is the SC-FDMA ("Yes" determination in step S201), the state of the base station 10 is changed to the active state St_11 by the control unit 366 (step S202). Here, when the access scheme of the wireless link 1100 is the SC-FDMA, the control unit 366 determines that the mobile station 100 is located near the edge of the cell 11 of the base station 1 with which the mobile station 100 establishes the wireless link (refer to FIG. 13). Namely, the control unit 366 estimates that the communication quality of the wireless link 1100 is not good and starts the transmission of the pilot signal from the base station 10. The control unit 366 reports to the RNC 200 via the network communication unit 350 that the operation state of the base station 10 has been changed to the active state St_11 (step S203).

In the wireless communication system according to the fifth exemplary embodiment described above, the base station 10 estimates the access scheme in the wireless link between the mobile station and another base station and controls the transmission of the pilot signal based on the estimated access scheme. Specifically, when the access scheme of the wireless link 1100 is the SC-FDMA, the state of the base station 10 is changed to the active state St_11 by the control unit 366 of the base station 10. Namely, in case of this wireless communication system, when at least one mobile station which is currently communicating with another base station (first base station), which has a possibility in which the communication quality is degraded, and in other words, which has a possibility in which the communication quality can be improved if the wireless link with the base station 10 is established exists, the base station 10 as the second base station starts to transmit the control signal (in other words, the operation state of the base station 10 is changed to the active state) for the first time then. Therefore, the number of the base stations that are activated uselessly like the patent document 1 can be reduced. As a result, the power consumed in the base station can be more surely suppressed and the electric wave interference between the base stations can be avoided.

Further, in the fifth exemplary embodiment described above, it has been explained that the recognition of the communication quality (in this case, access scheme) of the wireless link 1100 is performed by performing the estimation from the uplink signal that is transmitted from the mobile station in the vicinity of the base station 10 to another base station. However, the recognition of the above-mentioned access scheme in the base station 10 is not limited to the above-mentioned method. For example, a method in which the base station 10 receives the access scheme information itself on the wireless link 1100 from a backbone (for example, the RNC 200 or the base station 1) can be used.

[Sixth Exemplary Embodiment]

In a wireless communication system according to a sixth exemplary embodiment of the present invention, the above-mentioned second base stations (base stations 2, 4, 6, 8, and 10) described in the first exemplary embodiment to the fifth exemplary embodiment perform the recognition process and the determination process of the communication quality of the wireless link 1100 only when the mobile terminal 100 is located in the cell 12 of the second base station. By using such method, the operation state of the second base station is changed to the active state St_11 only when the mobile station that can perform a handover certainly exists. Namely, a problem in which when the base stations are activated, no mobile station that should perform the handover exits can be avoided. Therefore, the number of the base stations that are activated uselessly can be more surely reduced.

As an example of a method for confirming whether or not the mobile station exists in the cell of the second base station, for example, a method in which the received power of the uplink signal that is transmitted from the mobile station in the vicinity of the second base station to the first base station is measured by the second base station, the received power is compared with the predetermined threshold value, and the mobile station exists in the cell of the second base station when the received power is equal to or greater than the threshold value can be exemplified.

Additionally, as another example of the method for confirming whether or not the mobile station exists in the cell of the second base station, a method in which when an originating call from the mobile station to another base station is detected by the second base station from the uplink signal transmitted from the mobile station to the first base station, it is determined that the mobile station exists in the cell of the second base station can be used.

Further, as another example of the method for confirming whether or not the mobile station exists in the cell of the second base station, a method in which position information on the mobile station is received by the second base station via the backbone (for example, the RNC 200 or the first base station) and it is determined whether or not the mobile station exists in the cell of the second base station based on the position information can be used. Furthermore, a method in which the determination of whether or not the mobile station exists in the cell of the second base station is deferred to the backbone side and only information on the result (that is, information indicating whether or not it exists in the cell) is received by the second base station can be used.

[Seventh Exemplary Embodiment]

Figure 18:
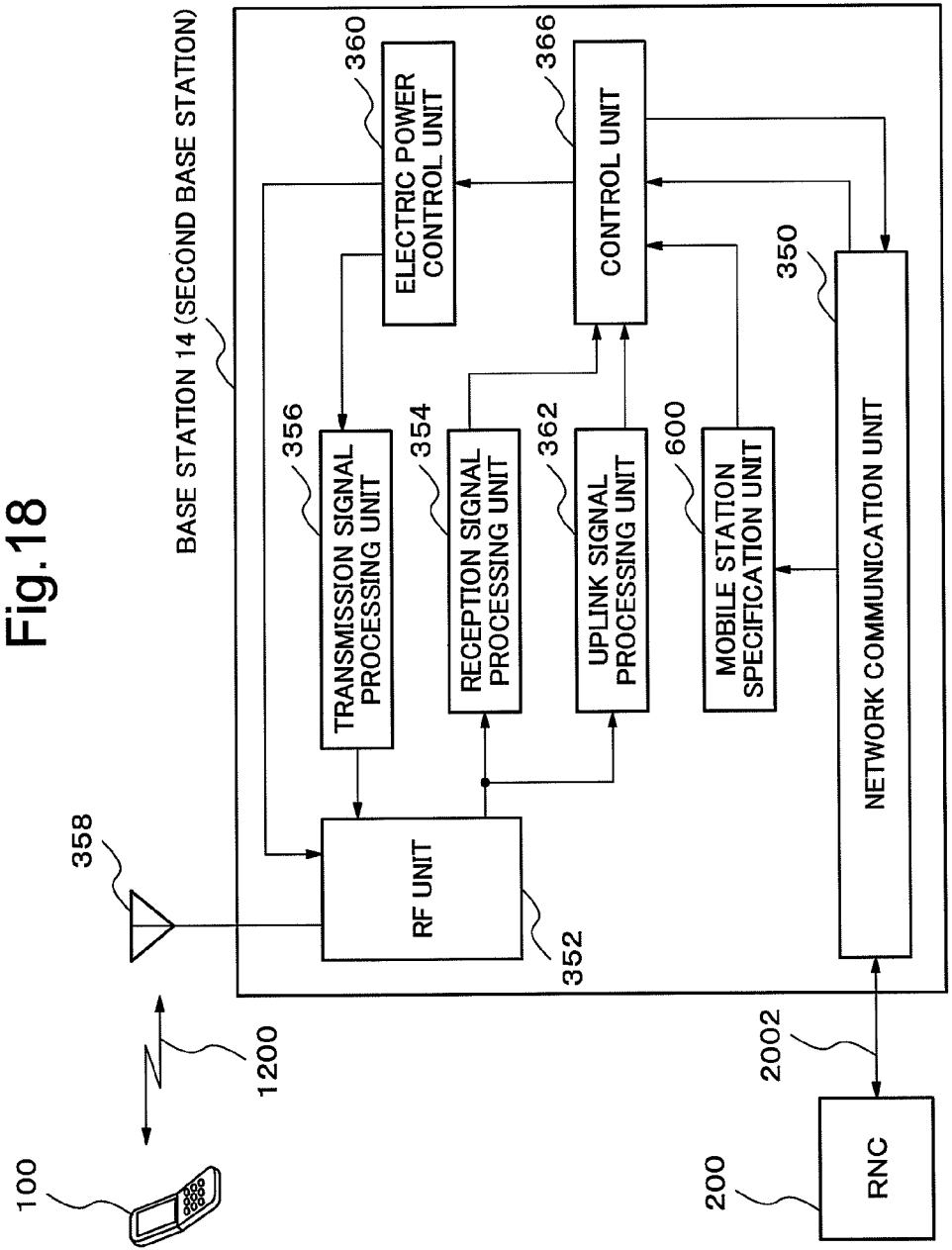
FIG. 18 is a block diagram showing an example of a second base station of which a wireless communication system according to a seventh exemplary embodiment of the present invention is composed.

FIG. 18 is a block diagram showing an example of a base station 14 as the second base station of which a wireless communication system according to a seventh exemplary embodiment of the present invention is composed. Further, in the wireless communication system, with the exception of the base station 14, a configuration group (the base station 1 as the first base station, the mobile station 100, and the RNC 200) in the seventh exemplary embodiment is the same as the configuration group explained in the first exemplary embodiment. Therefore, the description of them will be omitted. The base station 14 includes a mobile station specification unit 600 instead of the communication quality recognition unit 364A. This is a configuration difference between the base station 14 and the base station 2 shown in FIG. 3. A configuration of the base station 14 is the same as the configuration of the base station 2 shown in FIG. 3 with the exception of this mobile station specification unit 600. Therefore, the description of them will be omitted.

The mobile station specification unit 600 receives reception sensitivity (SNR, SIR, SINR, received power) information and wireless resource allocation information (in LTE, scheduling information on a resource block that is divided by time and frequency and in case of W-CDMA (Wideband Code Division Multiple Access), code assignment information on a scramble code used in an adjacent base station and a channelization code that has been already assigned to the mobile station) on the mobile station communicating with another base station from another base station or the RNC 200 via the network communication unit 350. The mobile station specification unit 600 specifies the mobile station whose reception sensitivity is low from the above-mentioned reception sensitivity information, specifies the uplink signal of the mobile station by using the above-mentioned wireless resource allocation information, and measures the received power of the specified uplink signal. If a target signal is a signal of the W-CDMA system, a correlation value obtained by a de-spreading process using the above-mentioned code assignment information is measured instead of the measurement of the received power of the uplink signal and it may be used.

The mobile station specification unit 600 compares the measured received power with the predetermined threshold value and specifies the mobile station whose communication quality is degraded on the wireless link (for example, the wireless link 1100) which has been already established and which is located in the cell 12 of the base station 14 based on the comparison result. The mobile station specification unit 600 notifies the control unit 366 of information indicating that the specific mobile station (that is, the mobile station whose communication quality is degraded on the wireless link which has been already established and which is located in the cell of the base station 14) exists. The state of the base station 2 is changed to the active state St_11 by the control unit 366 as mentioned above.

[Modification Example]

Further, in the first exemplary embodiment to the seventh exemplary embodiment described above, a function allocation of each compositional unit inside the first base station (for example, the base station 1) and the second base station (for example, the base station 2, the base station 4, the base station 6, the base station 8, the base station 10, and the base station 14) is not necessarily limited to the above-mentioned exemplary embodiments (refer to FIG. 2, FIG. 3, FIG. 8, FIG. 10, FIG. 14, FIG. 16, and FIG. 18). Therefore, the compositional unit currently used may be divided or integrated arbitrarily. Further, a function of the compositional unit may be reassigned to another compositional unit. For example, in the base station 2 as the second base station shown in FIG. 3, the communication quality recognition unit 364A and the control unit 366 can be integrated. Namely, this integration unit performs the function (the function to recognize the communication quality in the wireless link between the mobile station and another base station) of the communication quality recognition unit 364A and the function (the function to control the transmission of the control signal based on the communication quality) of the control unit 366. Namely, the base station including this integration unit has the same performance as the base station 2 shown in FIG. 3. Although the description is repeated, the function allocation and the name of the compositional unit of each base station in each above-mentioned exemplary embodiment are shown as an example. Therefore, the function allocation and the name can be arbitrarily changed without being restricted by the above-mentioned exemplary embodiment.

In the wireless communication system according to the first exemplary embodiment to the seventh exemplary embodiment described above, it has been explained that the second base station starts to transmit the pilot signal (in other words, the operation state of the second base station is changed to the active state) when the communication quality of the wireless link between one mobile station and another base station is degraded (relatively or absolutely degraded). However, the number of the targeted mobile station is not limited to one. For example, the transmission of the pilot signal may be started when the communication quality of the wireless links is degraded in a plurality of predetermined number of the mobile stations simultaneously.

In the first exemplary embodiment to the seventh exemplary embodiment described above, although an explanation is given for a case in which the pilot signal is used as the control signal, it is not limited to the pilot signal and a signal for reporting cell-specific information or system-specific information may be used.

Further, in the first exemplary embodiment to the seventh exemplary embodiment described above, although it has been explained that the first base station adds the cell of the base station whose operation state has been changed to the active state in the measurement cell set and instructs the mobile station to measure the cell, these processes can be omitted. In the case, the mobile station may independently measure the received power of the pilot signal, receive a discrimination signal of the cell from the control signal of the cell or perform another operation, and report the received power of the pilot signal together with the discrimination number of the cell.

Further, in the first exemplary embodiment to the seventh exemplary embodiment described above, although it has been explained that the base station is in a one-to-one correspondence with the cell, one base station can have a plurality of cells or sectors. In this case, the operation state of the base station can be changed from the active state to the electromagnetic wave transmission stop state or vice versa with respect to each cell or sector.

Further, in the first exemplary embodiment to the seventh exemplary embodiment described above, the first base station and the second base station can communicate with the mobile station by using not only one frequency band but also a plurality of frequency bands. When the plurality of frequency bands are used, the first base station and the second base station separately communicate with the mobile station by using an individual frequency band. In this case, the operation state of the base station can be changed from the active state to the electromagnetic wave transmission stop state or vice versa with respect to each frequency band.

Further, in the first exemplary embodiment to the seventh exemplary embodiment described above, it has been explained that the first base station (for example, the base station 1) and the second base station (for example, the base station 2) have a dedicated function, respectively and both base stations are dedicated apparatuses for carrying out its own purpose. However, if a function that is provided in only one of the base stations is provided in the other one, the first base station and the second base station have the same function. When such configuration is used, the task of the first base station can be carried out by the second base station and on the contrary, the task of the second base station can be carried out by the first base station.

Further, in the first exemplary embodiment to the seventh exemplary embodiment described above, the RNC 200 is not necessarily an essential compositional unit. For example, each of the first base station and the second base station may have a configuration in which the function of the RNC 200 is included. In this case, the first base station and the second base station are directly connected with each other via a predetermined communication network (for example, a wired communication network). In this case, for example, a method in which after the operation state of the second base station has been changed to the active state, it directly notifies the first base station instead of reporting to the RNC 200 and the measurement cell set is changed can be used.

Further, in the first exemplary embodiment to the seventh exemplary embodiment described above, it has been explained that each of the first base station and the second base station is controlled by dedicated hardware. However, a configuration in which the first base station and the second base station are operated under the control of a not-illustrated computer circuit (for example, CPU (Central Processing Unit)) that operates based on a control program may be used.

Furthermore, the cell structure of the first and second base stations of the wireless communication system of the first exemplary embodiment to the seventh exemplary embodiment described above can be configured as a hierarchical cell (it is called an overlapping cell) structure. For example, the cell of the first base station is configured as a macro cell. The cell of the second base station is configured as the macro cell which covers an entire cover area and in which a small cell (for example, a micro-cell, a microcell, a nano cell, a femto cell, or the like) is included.

The invention of the present application has been described with reference to the exemplary embodiment above. However, the invention of the present application is not limited to the above-mentioned exemplary embodiment. Various changes in configuration of the invention of the present application and details understood by those skilled in the art can be made without departing from the scope of the invention of the present application.

This application claims priority based on Japanese Patent Application No. 2008-324532 filed on Dec. 19, 2008 and the disclosure of which is hereby incorporated in its entirety.

DESCRIPTION OF SYMBOL

1, 2, 4, 6, 8, 10, 14 base station
11, 12 cell of base station
100 mobile station
200 RNC
360 electric power control unit
362 uplink signal processing unit
364 communication quality recognition unit
366 control unit
370 throughput recognition section
380 reception sensitivity recognition section
400 modulation scheme estimation section
450 stream number estimation section
500 access scheme estimation section
600 mobile station specification unit

The invention claimed is:

1. A base station comprising:
a recognition unit that recognizes the communication quality in a wireless link between a mobile station and another base station;
a transmission control unit that controls the transmission of a control signal based on a recognized communication quality, and
a measurement unit that measures a received power of an uplink signal transmitted from the mobile station to the another base station,
wherein the recognition unit receives information about the communication quality from another apparatus, and the recognition unit recognizes operating throughput of the wireless link as the communication quality,
wherein the transmission control unit controls the transmission of the control signal based on a relationship between the operating throughput and the received power, and
wherein the transmission control unit starts to transmit the control signal when it is determined that expected throughput obtained when the mobile station is connected to the base station is higher than the operating throughput.

2. The base station according to claim 1, wherein
the recognition unit estimates the communication quality based on an uplink signal from the mobile station to another base stations.

3. A base station comprising:
a recognition unit that recognizes the communication quality in a wireless link between a mobile station and another base station;
a transmission control unit that controls the transmission of a control signal based on a recognized communication quality, and
a measurement unit that measures the reception sensitivity of an uplink signal transmitted from the mobile station to the another base station in the base station, and the transmission control unit controls the transmission of the control signal based on a relationship between the reception sensitivity at the another base station and the reception sensitivity at the base station;
wherein the recognition unit receives information about the communication quality from another apparatus and recognizes a reception sensitivity of the wireless link as the communication quality at the another base station, and
wherein the transmission control unit starts to transmit the control signal when it is determined that reception sensitivity at the base station is higher than the reception sensitivity at the another base station.

4. The base station according to claim 3, wherein
the reception sensitivity at the base station or the another base station is a signal to noise ratio of the wireless link.

5. The base station according to claim 1, wherein
the transmission control unit determines whether or not the mobile station is located in a communication range of the base station and controls the transmission of the control signal when the mobile station is located in the communication range.

6. The base station according to claim 5, wherein
the transmission control unit determines that the mobile station is located in the range when the received power of the uplink signal that is transmitted from the mobile station to another base station is equal to or greater than a predetermined threshold value.

7. A base station comprising:
a recognition unit that recognizes the communication quality in a wireless link between a mobile station and another base station; and
a transmission control unit that controls the transmission of a control signal based on a recognized communication quality, wherein
the base station further comprises a specification unit for receives signal to interference noise ratio information and wireless resource allocation information of the mobile station communicating with another base station from another apparatus, specifying the uplink signal of the mobile station whose signal to interference noise ratio is low from the wireless resource allocation information, measuring the received power of the specified uplink signal, and thereby, specifying the mobile station whose communication quality of the wireless link is degraded and which is located in a cell of the base station and the control unit controls the transmission of the control signal based on the specified result of the specification unit.

8. A wireless communication system comprising:
a first base station,
a second base station, and
at least one mobile station which can communicate with the first base station and the second base station;
wherein the second base station comprises:
a recognition unit that recognizes the communication quality in a wireless link between the mobile station and the first base station,
a transmission control unit that controls transmission of a control signal according to a recognized communication quality in the wireless link between the mobile station and the first base station, and
a measurement unit that measures a received power of an uplink signal transmitted from the mobile station to the first base station,
wherein the recognition unit receives information about the communication quality from another apparatus and the recognition unit recognizes operating throughput of the wireless link as the communication quality,
wherein the transmission control unit controls the transmission of the control signal based on a relationship between the operating throughput and the received power, and
wherein the transmission control unit starts to transmit the control signal when it is determined that expected throughput obtained when the mobile station is connected to the second base station is higher than the operating throughput.

9. A method for controlling a base station, the method comprising:
recognizing communication quality in a wireless link between a mobile station and another base station,
measuring a received power of an uplink signal transmitted from the mobile station to the another base station, and
controlling transmission of a control signal from the base station based on the recognized communication quality,
wherein the recognizing the communication quality comprises receiving information about the communication quality from another apparatus, and recognizing an operating throughput of the wireless link as the communication quality, and
wherein controlling the transmission of the control signal comprises controlling the transmission of the control signal based on a relationship between the operating throughput and the received power, and starting to transmit the control signal when it is determined that expected throughput obtained when the mobile station is connected to the base station is higher than the operating throughput.

10. A wireless communication method in a wireless communication system including a first base station, a second base station, and at least one mobile station which can communicate with the first base station and the second base station, the method comprising:
the section base station,
recognizing communication quality in a wireless link between the mobile station and the first base station, measuring a received power of an uplink signal transmitted form the mobile station to the first base station, and controlling transmission of a control signal from the second base station based on the recognized communication quality wherein the recognizing the communication quality comprises receiving information about the communication quality from another apparatus and recognizing an operating throughput of the wireless link as the communication quality, wherein the controlling the transmission of the control signal comprises controlling the transmission of the control signal based on a relationship between the operating throughput and the received power, and starting to transmit the control signal when it is determined that expected throughput obtained when the mobile station is connected to the base station is higher than the operating throughput.

11. A computer readable medium which causes a computer of a base station to perform a method comprising:

recognizing communication quality in a wireless link between a mobile station and another base station, measuring a received power of an uplink signal transmitted from the mobile station to the another base station, and controlling transmission of a control signal from the base station based on the recognized communication quality, wherein the recognizing the communication quality comprises receiving information about the communication quality from another apparatus, and recognizing an operating throughput of the wireless link as the communication quality, and wherein controlling the transmission of the control signal comprises controlling the transmission of the control signal based on a relationship between the operating throughput and the received power, and starting to transmit the control signal when it is determined that expected throughput obtained when the mobile station is connected to the base station is higher than the operating throughput.

12. A mobile station which can communicate with a first base station and a second base station the mobile station comprising:

a transmitting unit that transmits an uplink signal to the first base station, wherein the uplink signal is received by the second base station, and a receiving unit that receives a control signal transmitted from the second base station based on communication quality in a wireless link between the mobile station and the first base station that is recognized based on the transmission signal in the second base station, wherein the receiving unit starts to receive the control signal when the second base station determines that expected throughput obtained when the mobile station is connected to the second base station is higher than an operating throughput of a wireless link between the mobile station and the first base station.

* * * * *

UNITED STATES PATENT AND TRADEMARK OFFICE
CERTIFICATE OF CORRECTION

PATENT NO.        : 8,787,185 B2                        Page 1 of 1
APPLICATION NO.   : 13/140631
DATED             : July 22, 2014
INVENTOR(S)       : Kazushi Muraoka et al.

It is certified that error appears in the above-identified patent and that said Letters Patent is hereby corrected as shown below:

In the Specification

Column 8, line 40: After: "S12)." insert -- Here, the measurement cell set is a list of the cells (base stations) that are targets for which the received power of the pilot signal is measured by the mobile station. The base station 1 which receives the instruction updates the measurement cell set in the base station 1 and deletes the base station 2 (step S 13). --.

In the Claims

Column 26, Line 65, Claim 10: Delete "section" and insert -- second --.

Signed and Sealed this
Thirteenth Day of January, 2015

Michelle K. Lee
*Deputy Director of the United States Patent and Trademark Office*